(12) United States Patent
Yamaoka

(10) Patent No.: US 6,277,266 B1
(45) Date of Patent: Aug. 21, 2001

(54) DEVICE FOR PRODUCING ION WATER AND PARTITION WALL FOR DEVICE FOR PRODUCING ION WATER

(76) Inventor: Tateki Yamaoka, 1217-3 Yamazakicho, Machida-shi, Tokyo (JP)

( * ) Notice: Subject to any disclaimer, the term of this patent is extended or adjusted under 35 U.S.C. 154(b) by 0 days.

(21) Appl. No.: 09/274,528

(22) Filed: Mar. 23, 1999

(51) Int. Cl.[7] ................................................ C02F 1/461
(52) U.S. Cl. ........................................ 205/746; 205/749
(58) Field of Search .................................... 205/746, 749

(56) References Cited

U.S. PATENT DOCUMENTS 4,210,502 * 7/1980 Watanabe et al. ................... 205/749

* cited by examiner

Primary Examiner—Arun S. Phasge
(74) Attorney, Agent, or Firm—Jordan and Hamburg LLP

(57) ABSTRACT

A device for producing ion water comprises an electrolytic cell; two partition walls disposed such that the electrolytic cell is partitioned into three electrolytic chambers, having an ion exchange membrane; an anode provided in an intermediate electrolytic chamber of the electrolytic cell such that the anode is attached fixedly or movably in the direction of the electrolytic chambers located at both sides of the electrolytic cell; and a cathode provided in each of the electrolytic chambers located on both sides of the electrolytic cell such that the cathode is attached fixedly or movably in a direction such that the distance between the anode and cathode changes, each cathode being fed half the amount of electric current which is delivered to the anode, so that the desired pH of three kinds of ion water can be achieved by controlling the quantity of hydrogen ions generated as determined by the amount of electricity delivered.

13 Claims, 25 Drawing Sheets

DEVICE FOR PRODUCING ION WATER AND PARTITION WALL FOR DEVICE FOR PRODUCING ION WATER

BACKGROUND OF THE INVENTION

The present invention is related to a device for producing ion water by electrolysis and a partition wall adapted for the device for producing ion water which generates alkaline functional water (alkaline ion water) for the promotion of health and water (acid ion water) for use in medical applications, e.g., sterilization or the like.

A conventional device for the electrolysis of water is composed of an electrolytic cell in which is disposed an ion exchange membrane at the central portion thereof; an anode disposed in one of the electrolytic chambers of the electrolytic cell; and a cathode disposed in another electrolytic chamber in the electrolytic cell, and the electrolysis of water is accomplished by the above-mentioned device.

By conventional electrolysis using an ion exchange membrane, most electric charge movements are effected by the movement of cations from the anode to the cathode. Further, in order to prevent contrary movement of hydroxide ions, a fall of pH of the acid ion water which has formed in the anode chamber is also effected.

Additionally, when it is caused by the electrolysis of an equivalent quantity of water, the reaction in the cathode chamber includes an undesirable rise in the pH of the alkaline ion water.

SUMMARY OF THE INVENTION

In view of the foregoing, it is an object of the present invention to provide a device for producing ion water by means of which the desired pH of each of three kinds of ion water can be achieved by controlling the quantity of hydrogen ions generated by the amount of electricity delivered, which can be reduced by half.

It is another object of the present invention to provide a device for producing ion water by means of which water introduced into the electrolytic cell is electrolyzed into pure ion water. Furthermore, it is still another object of the present invention to provide a device for producing ion water having a high ion density.

The novel features which are believed to be characteristic of the invention, both as to its organization and method of operation, together with further objects and advantages thereof, will be better understood from the following description considered in connection with accompanying drawings in which a presently preferred embodiment of the invention is illustrated by way of example. It is to be expressly understood, however, that the drawings are for the purpose of illustration and description only, and are not intended as a definition of the limits of the invention.

DESCRIPTION OF THE PREFERRED EMBODIMENT

Figure 1:
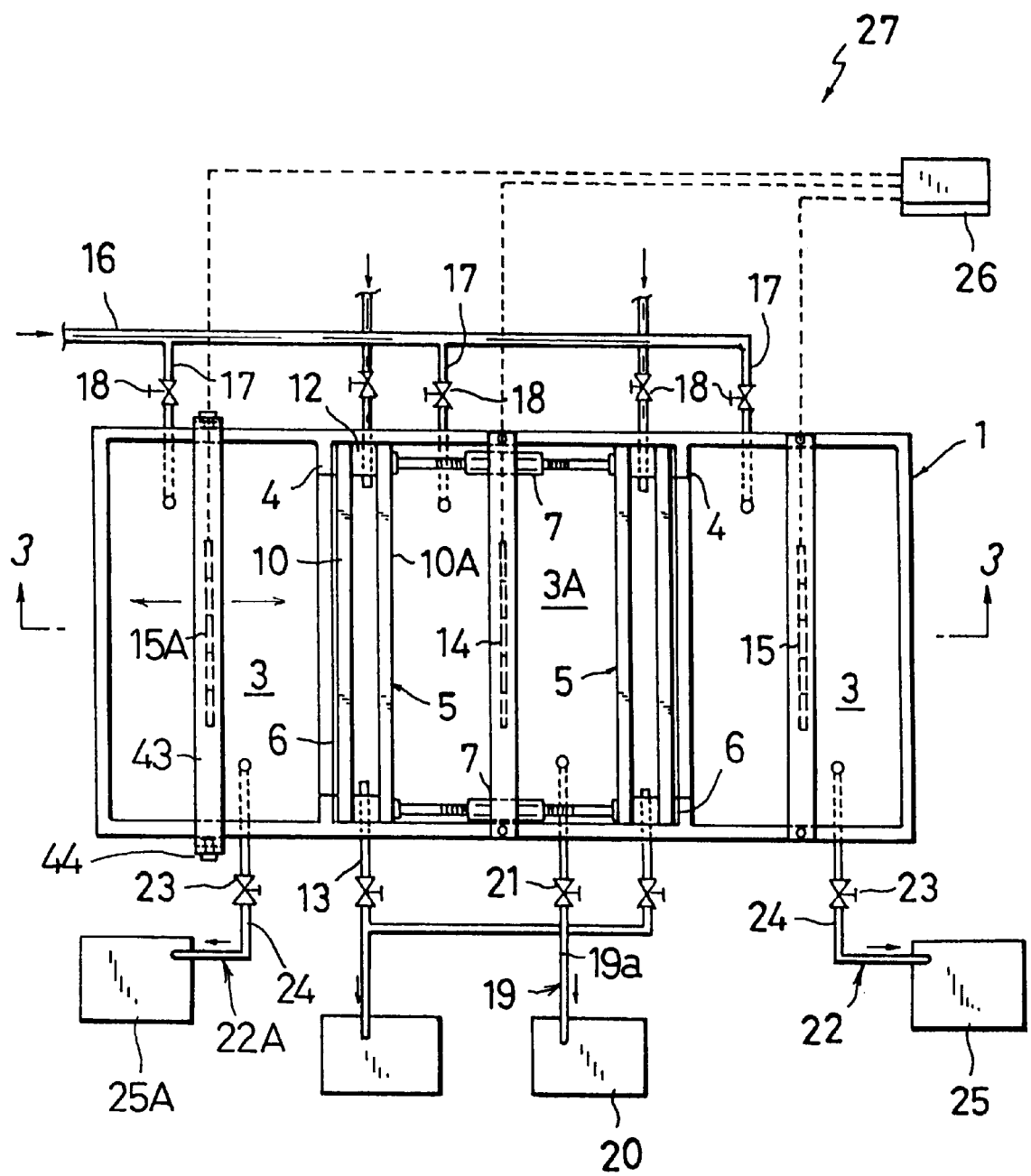
FIG. 1 is a plan view showing a first embodiment of the present invention.
Figure 2:
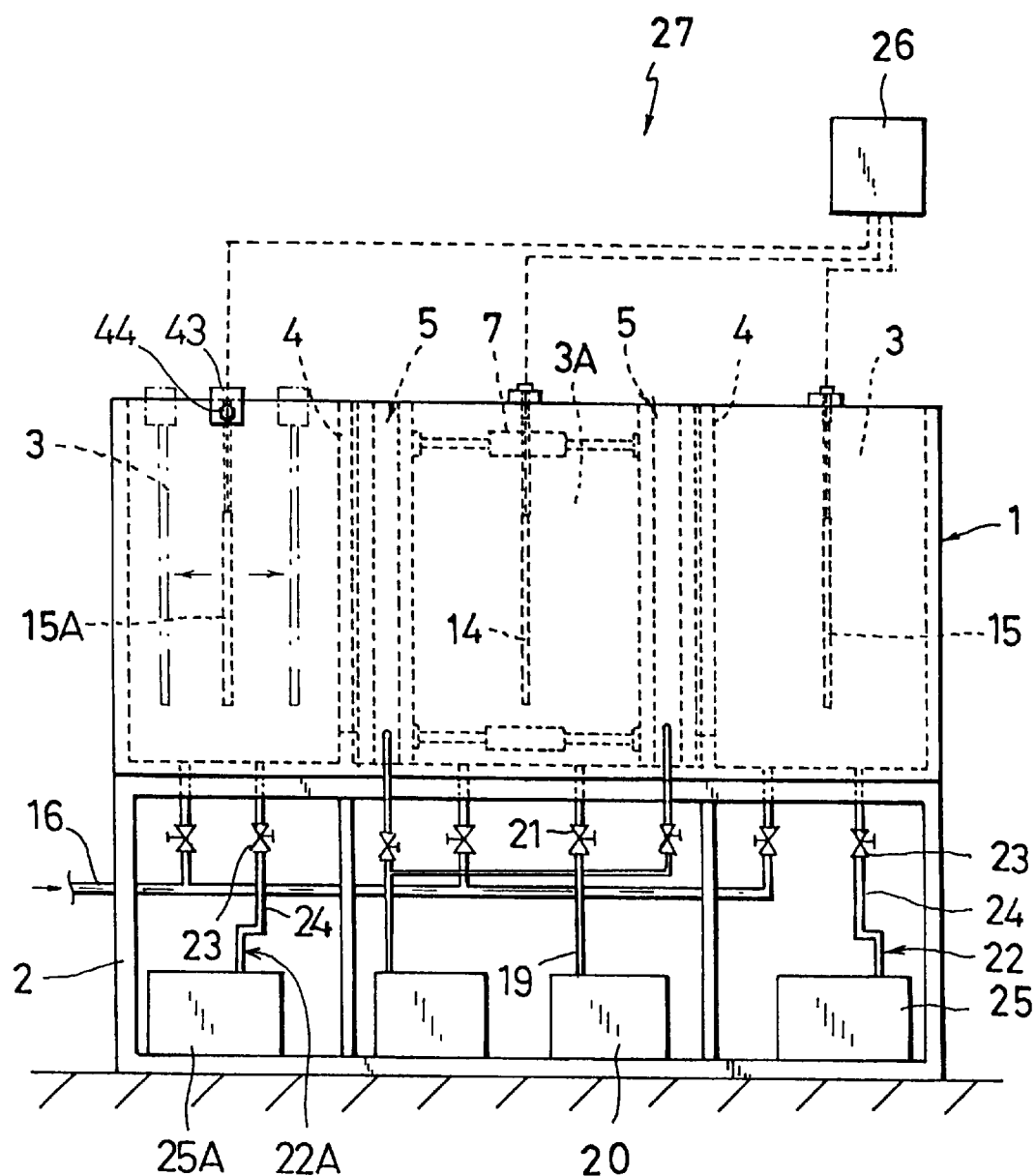
FIG. 2 is a font view showing a first embodiment of the present invention.
Figure 3:
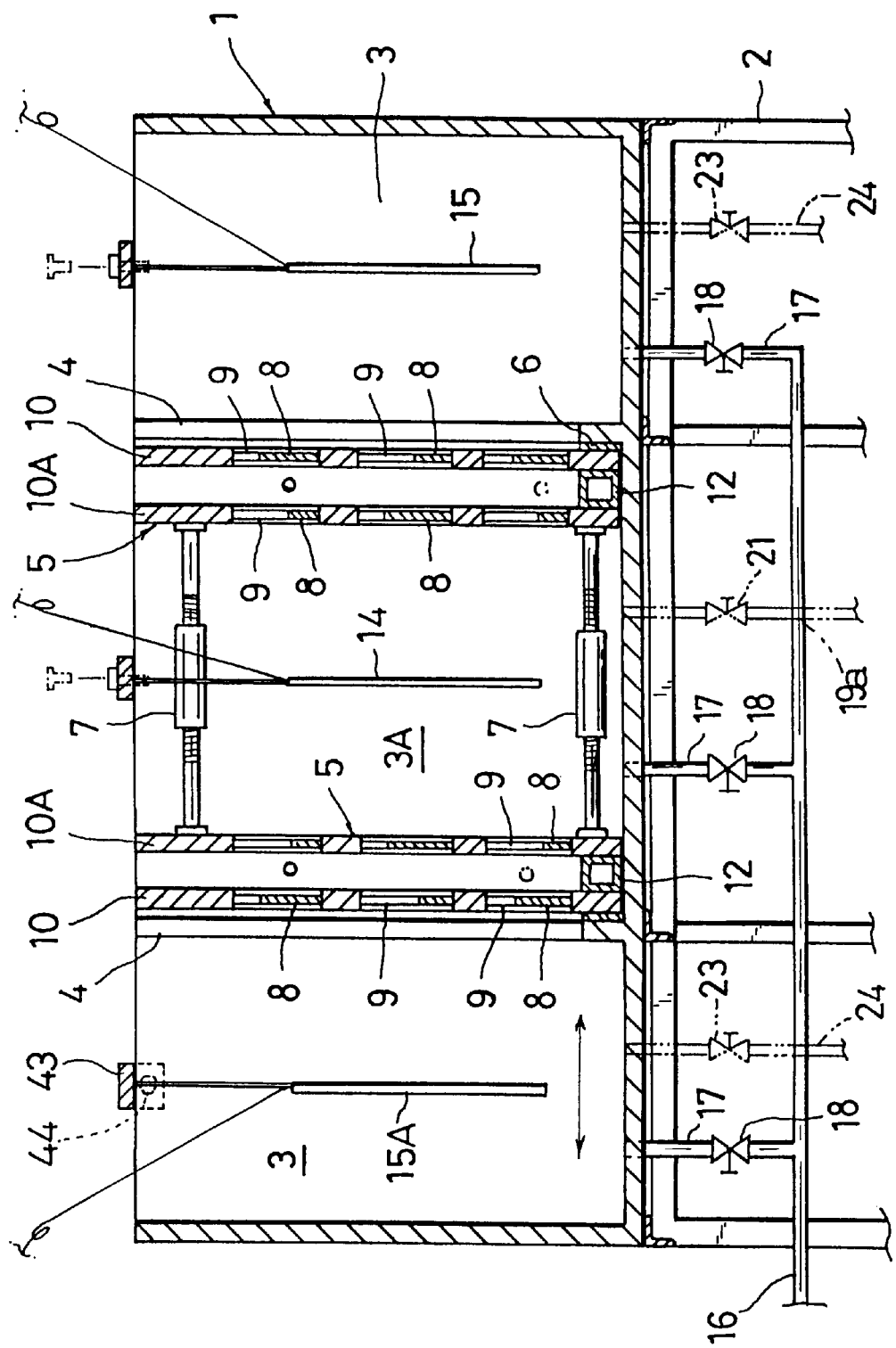
FIG. 3 is an expanded cross sectional view taken along the line 3—3 of FIG. 1.

Preferred embodiments of the present invention will now be described in more detail below referring to the accompanying drawings.

FIGS. 1 to 6 illustrate device 27 as a first embodiment of the present invention wherein numeral 1 is an electrolytic cell which can electrolyze water, the electrolytic cell 1 being located in an upper portion of a frame 2. Numeral 4,4 are support members which are located at an inner wall surface of electrolytic cell 1 such that electrolytic cell 1 is partitioned into three electrolytic chambers 3, 3A, 3, respectively.

Figure 4:
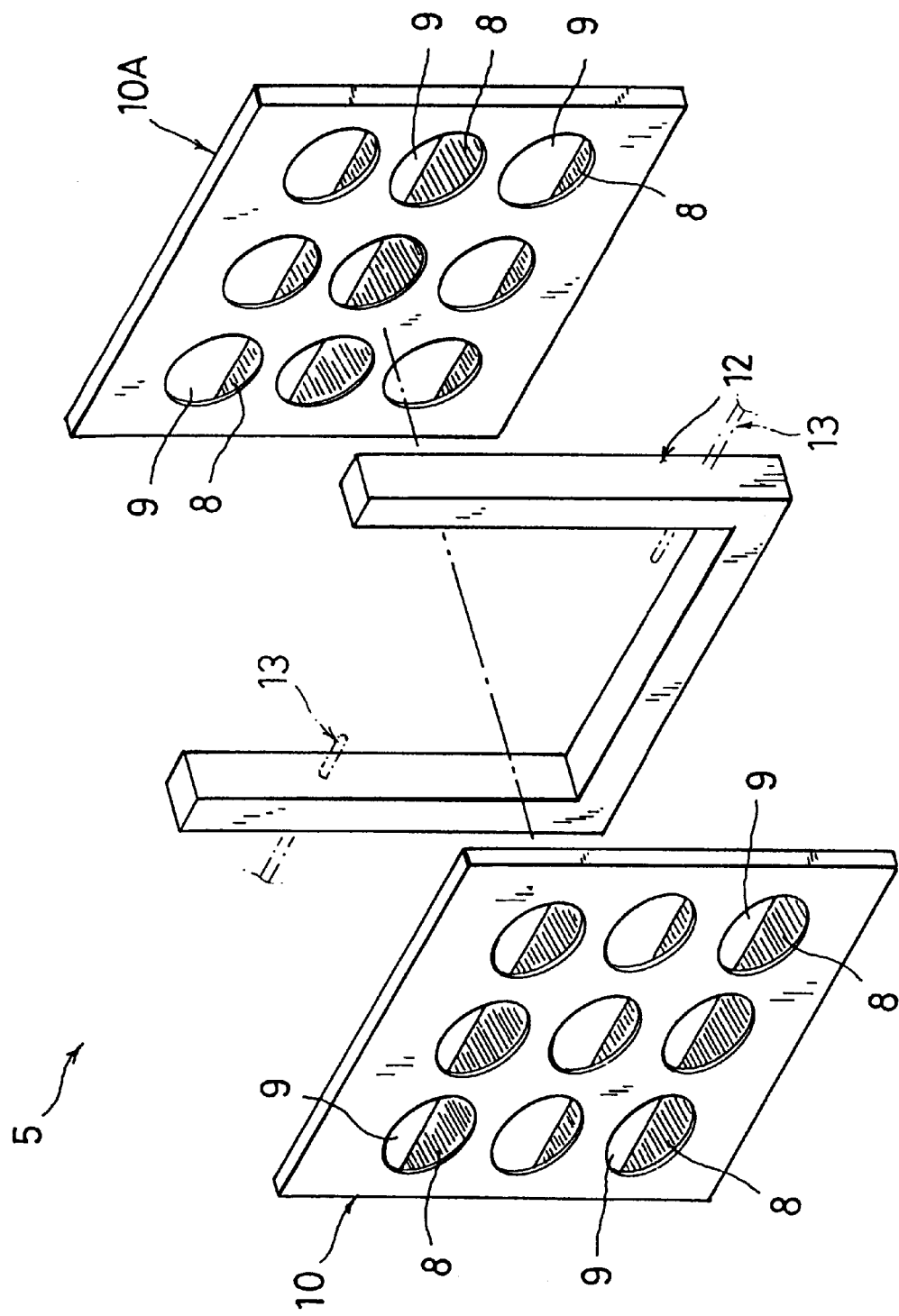
FIG. 4 is an exploded perspective view of a partition wall in the first embodiment of the present invention.
Figure 5:
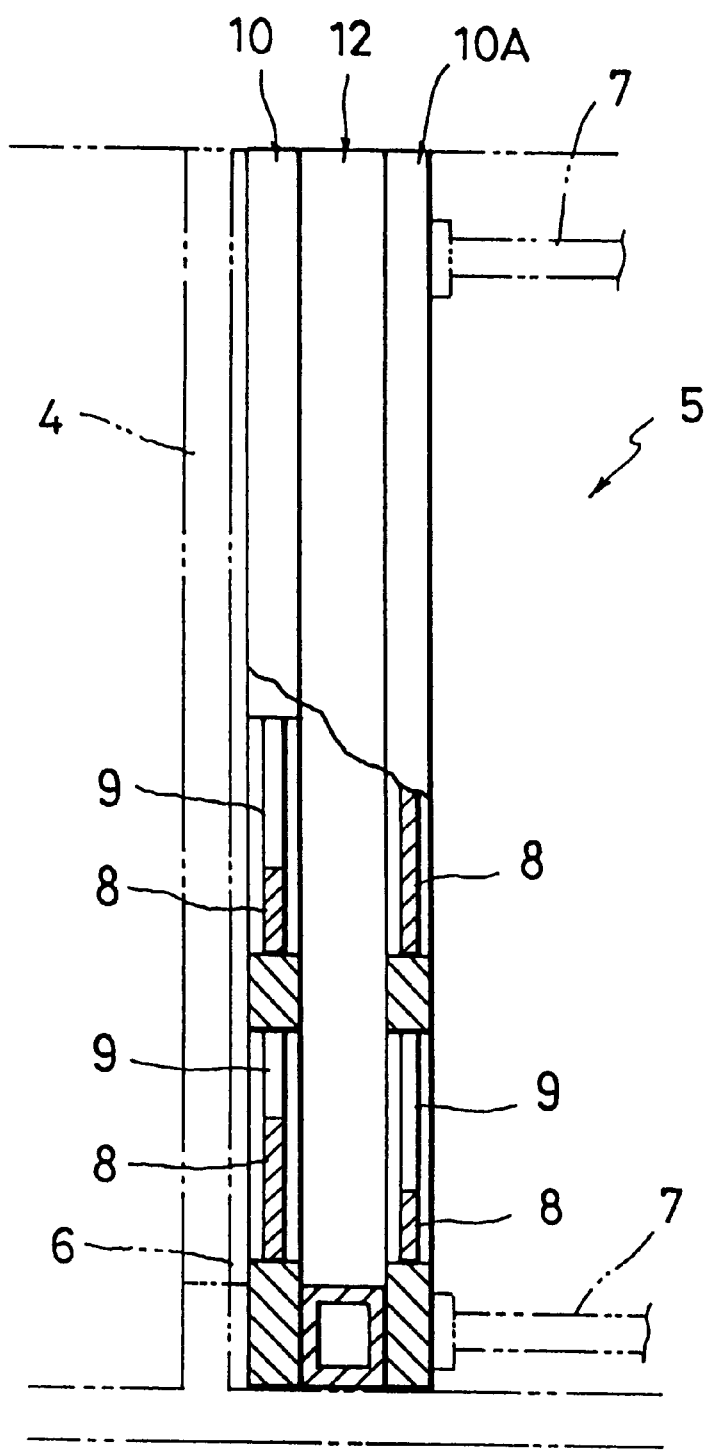
FIG. 5 is a partial cut-off explanation view of a partition wall in the first embodiment of the present invention.

Numeral 5, 5 indicate two partition walls which are fixed by pressure with press tools 7, 7, 7 and 7 using four turn-buckle mechanisms via seal materials 6, 6 on support members 4, 4 which partition electrolytic cell 1 into three electrolytic chambers 3, 3A, 3. Partition walls 5, 5 as illustrated in FIGS. 4 and 5 are composed of a pair of partition wall bodies 10, 10A; a framed body 12 in the shape of a channel; and a water supply pipe 13. Partition wall bodies 10, 10A are attached to a plurality of anode exchange membranes 8 and a plurality of cathode exchange membranes 9 thereto, the partition wall bodies 10, 10A being supported by support members 4,4. Framed body 12 is provided to form a water chamber 11 between partition wall bodies 10, 10A. Water supply pipe 13 supplies feed water to water chamber 11 in framed body 12.

Numeral 14 indicates a non-movable anode which is a platinum plated titanium element, anode 14 being positioned fixedly in intermediate electrolytic chamber 3A of electrolytic cell 1.

Numeral 15 indicates a non-movable cathode which is located fixedly in electrolytic cell 1 such that cathode 15 is positioned adjacent a central portion of the cell in chamber 3, cathode 15 being a platinum plated titanium element and being fed half the electric current of flowing to anode 14.

Numeral 15A indicates a movable cathode of a platinum plated titanium element placed in electrolytic cell 1 allowing for a setting position to be chosen using a support member 43 fitted by locking bolts 44,44 such that cathode 15A can be positioned optionally into another position in electrolytic chamber 3 of electrolytic cell 1. Also cathode 15A supplies half the amount of the electric current flowing to anode 14.

Numeral 16 indicates a water pipe supplying feed water to be electrolyzed to each electrolytic chamber 3, 3A, 3 of electrolytic cell 1 by branch pipes 17, 17, 17.

Branch pipes 17, 17, 17 extending from supply pipe 16 have opening and shutting valves 18, 18, 18 which are interposed between openings of branch pipes 17 and water supply pipe 16, respectively.

Numeral 19 indicates a collecting device which drains pure acid ion water generated in intermediate electrolytic chamber 3A of electrolytic cell 1 to acid ion water storage tank 20 through acid ion water drainpipe 19a having an opening and shutting valve 21.

Numeral 22,22A are collecting devices which drain pure alkaline ion water generated in electrolytic chambers 3,3 located at both sides of electrolytic cell 1 to alkaline ion water storage tanks 25 and 25A through alkaline ion water drainpipes 24,24 having opening and shutting valves 23,23.

Numeral 26 indicates a voltage controller which controls the voltage supplying the amount of a desired electric current to anode 14, non-movable cathode 15 and movable cathode 15A.

At start-up of device 27 for producing ion water of the above-mentioned structure, movable cathode 15A is placed in a position equal to the distance between anode 14 and non-movable cathode 15 when alkaline ion water is generated in each of electrolytic chambers 3,3 of electrolytic cell 1. On the other hand, movable cathode 15A is placed in a position such that the distance between anode 14 and movable cathode 15A is equal to that between anode 14 and cathode 15.

Then, valves 18, 18, 18 of water supply pipe 16 are opened, supplying a predetermined quantity of feed water into electrolytic chambers 3, 3A respectively, after which valves 18, 18, 18 are shut. In addition, water is supplied to water chambers 11, 11 by water supply pipes 13, 13 of partition walls 5, 5.

Figure 6:
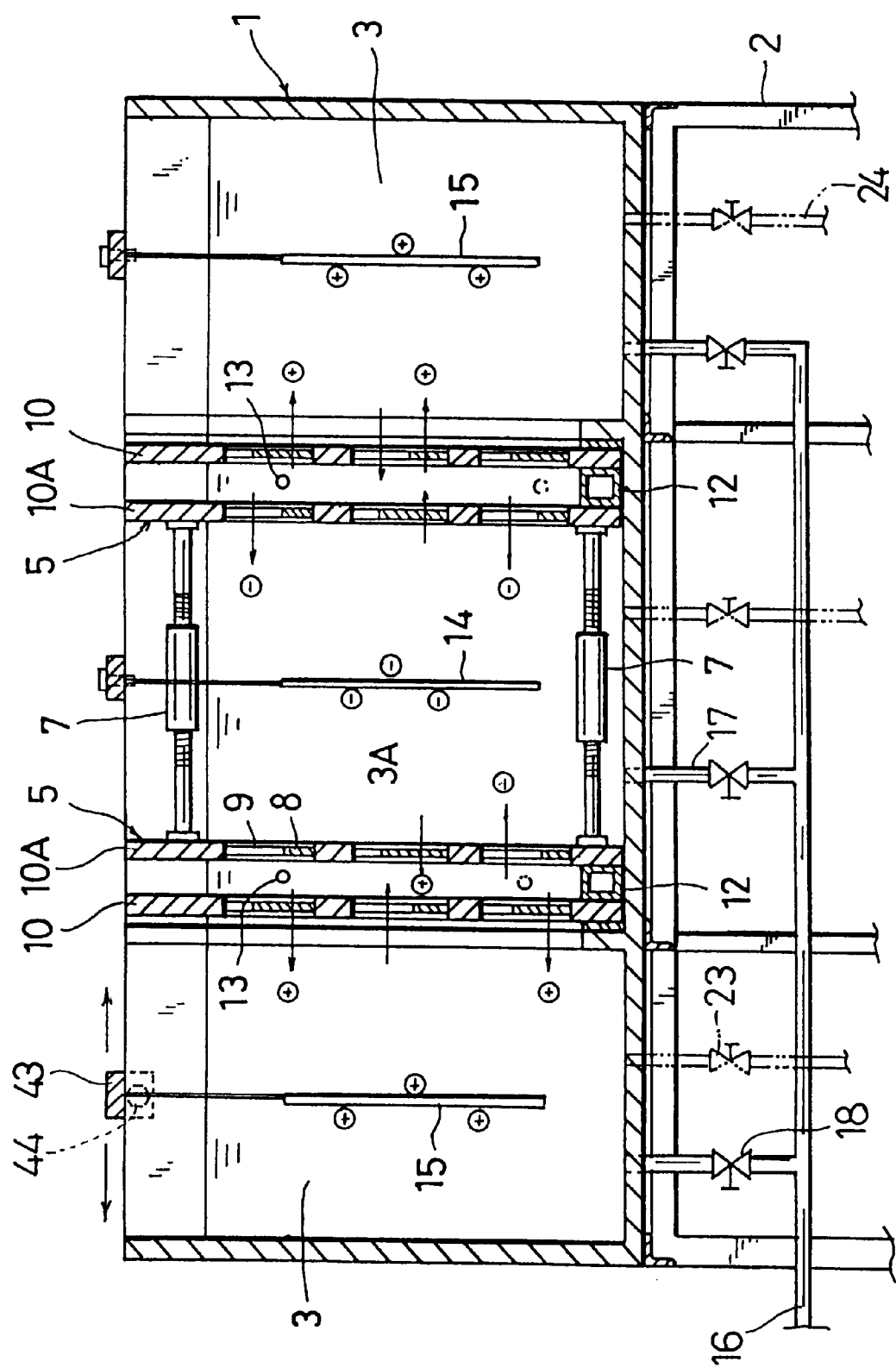
FIG. 6 is an explanation view during electrolysis of the first embodiment of the present invention.

Afterward, an electric current flows to anode 14, and non-movable cathode 15 and movable cathode 15A in a fixed time, and the water is electrolyzed. Then, the anions and cations which move electric charge by an electrolysis reaction are separated by the cation exchange membrane and the anion exchange membranes, and they are selected thereby. As illustrated in FIG. 6, the cations in the water in intermediate electrolytic chamber 3A, containing anode 14, of electrolytic cell 1 pass through cation exchange membranes 8, 8 in partition wall bodies 10, 10A which are in partition walls 5, 5. Cations are introduced into electrolytic chambers 3, 3, containing non-movable cathode 15 and movable cathode 15A, which are located at both sides of electrolytic cell 1.

Moreover, anions in the water of electrolytic chambers 3, 3, containing non-movable cathode 15 and movable cathode 15A, which are located at both sides of electrolytic cell 1 pass through anion exchange membranes 9, 9 in partition wall bodies 10, 10A of partition walls 5, 5. Anions are introduced into electrolytic chamber 3A, containing anode 14, which is located in the central portion of electrolytic cell 1.

In addition, cations in the feed water supplied to water chambers 11, 11 respectively located between the pairs of partition wall bodies 10, 10A and 10, 10A of partition walls 5, 5 are introduced into electrolytic chambers 3, 3 located at both sides of electrolytic cell 1. Also, anions are introduced into intermediate electrolytic chamber 3A, and ion concentration is raised. Then, pure acid ion water at a pH of 3.0 to 3.2 is generated in intermediate electrolytic chamber 3A, and pure alkaline ion water having a pH in the same range of 9.2 to 9.8 or in the different ranges of 9.1 to 9.5 and 9.6 to 9.9 is also generated in electrolytic chambers 3, 3 located at both sides of electrolytic cell 1.

When acid ion and alkaline ion water are generated in this way, opening and shutting valve 21 of acid ion water drainpipe 19 is opened, and acid ion water is stored in acid ion water storage tank 20. Also opening and shutting valves 23,23 of alkaline ion water drainpipes 22,22A are opened, and the alkaline ion water is stored in alkaline ion water storage tanks 25,25A.

Furthermore, the water which is passed through partition walls 5, 5 can be used as the spare water to produce pure water.

DIFFERENT PREFERRED EMBODIMENTS OF THE INVENTION

Other embodiments of the present invention will now be described referring to FIGS. 7 to 28. Throughout the drawings of the embodiments, like components are denoted by like numerals as of the first embodiment and will not therefore be explained in greater detail.

Figure 7:
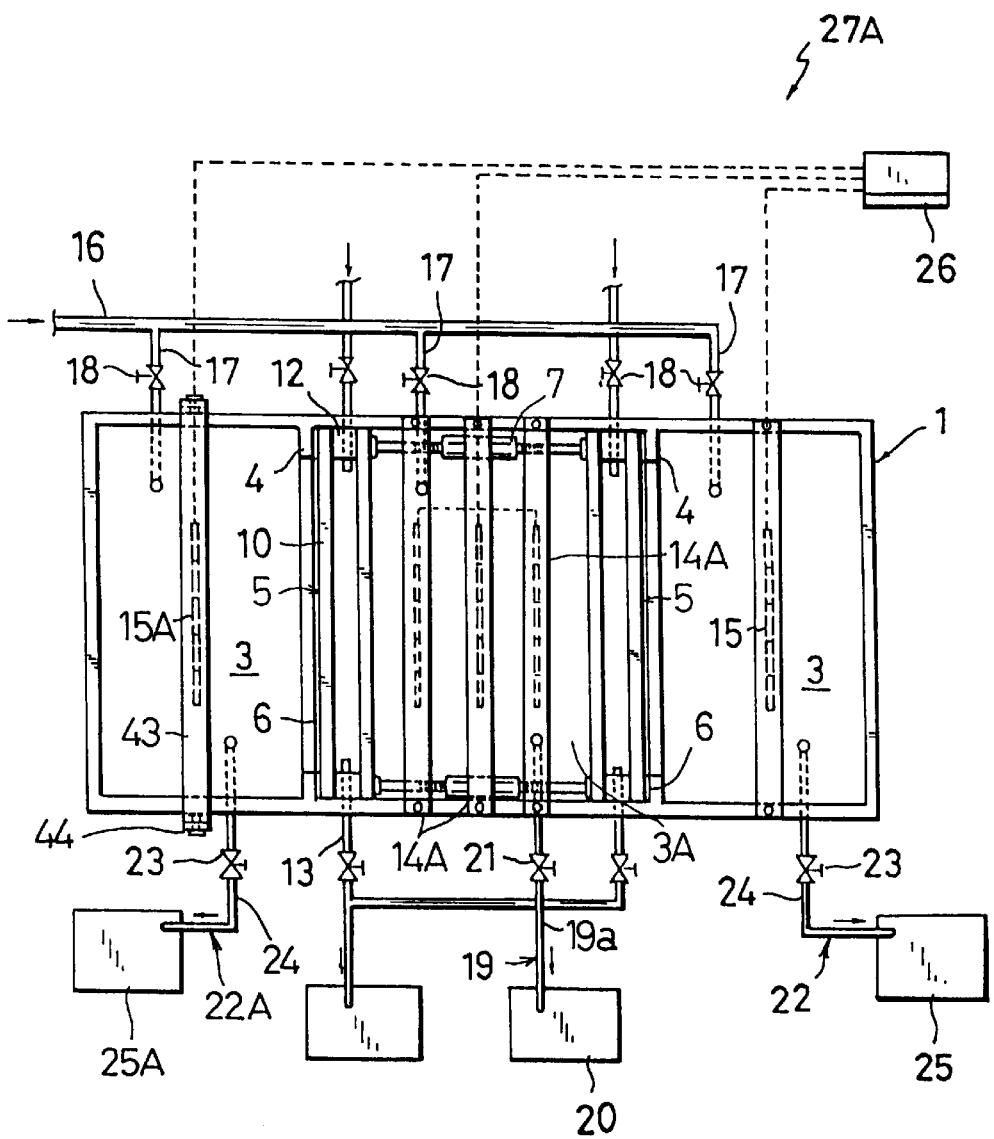
FIG. 7 is a plan view showing a second embodiment of the present invention.
Figure 8:
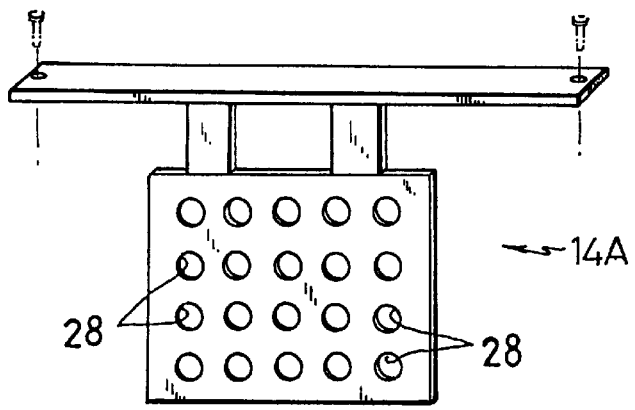
FIG. 8 is an explanation view of an anode in the second embodiment of the present invention.

FIGS. 7 and 8 illustrate device 27A as the second embodiment of the present invention; this is distinguished from the first embodiment in that at least two anodes, three of which 14A, 14A, 14A are shown in these figures, and are platinum plated titanium plates, having a plurality of holes 28, arranged in a row at predetermined intervals in intermediate electrolytic chamber 3A of electrolytic cell 1. This results in a reduction of the amount of electricity utilized. Moreover, such structures can be used to effect the electrolysis of water containing heavy metal. Also ions can move through holes 28 of anodes 14A, 14A, 14A, and device 27A can be used to produce strong acid ion water and strong alkaline ion water easily.

Figure 9:
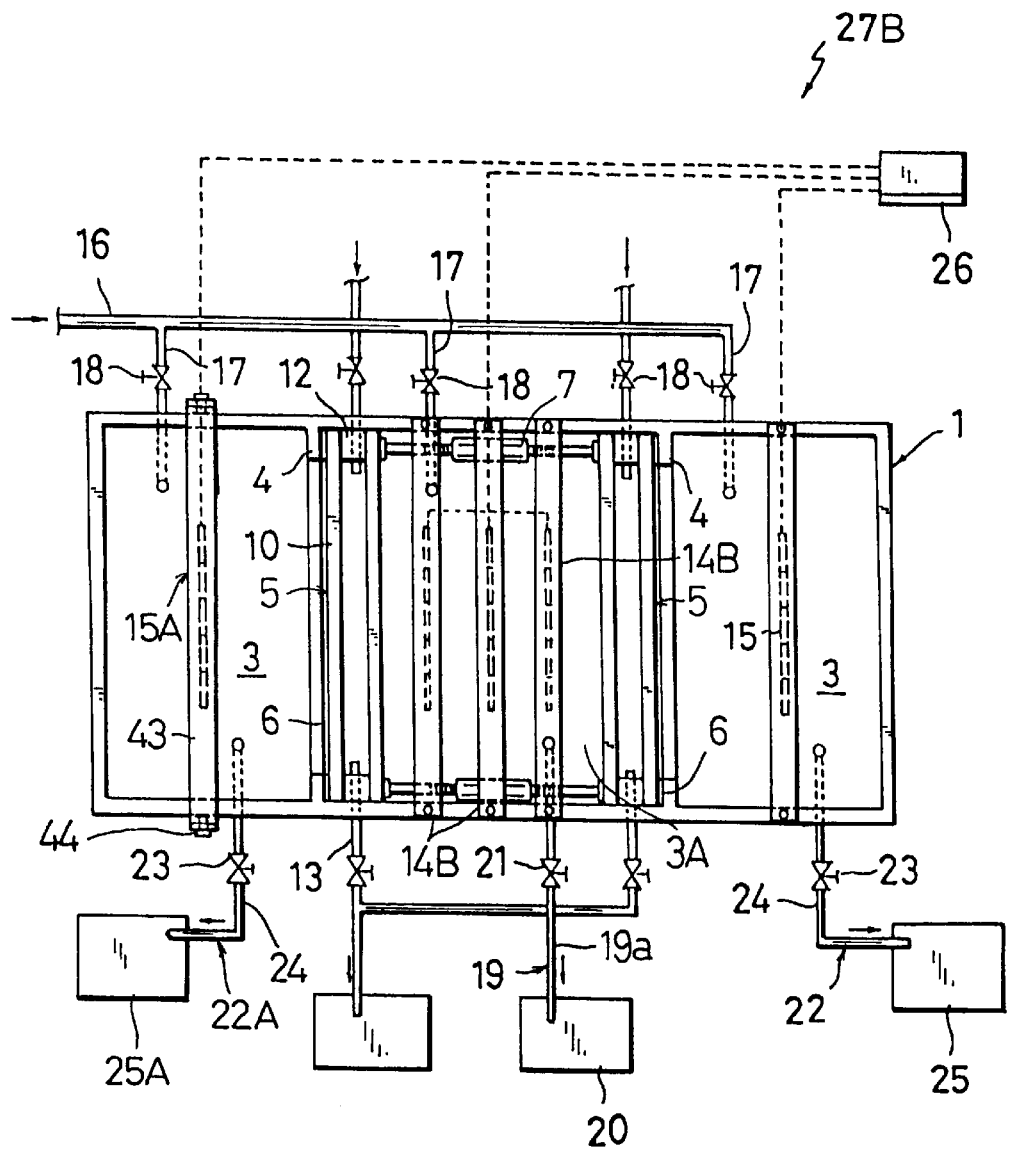
FIG. 9 is a plan view showing a third embodiment of the present invention.
Figure 10:
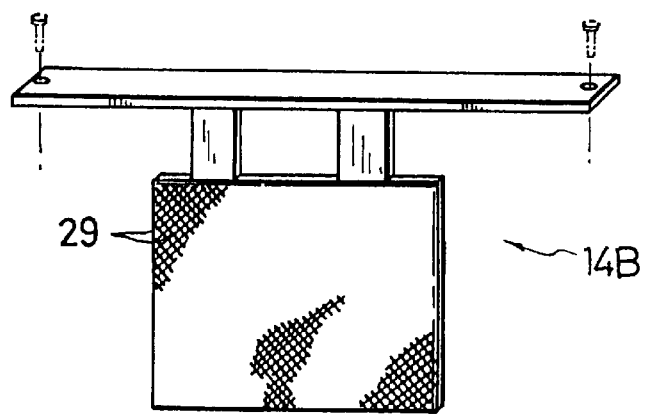
FIG. 10 is an explanation view of an anode in the second embodiment of the present invention.
Figure 11:
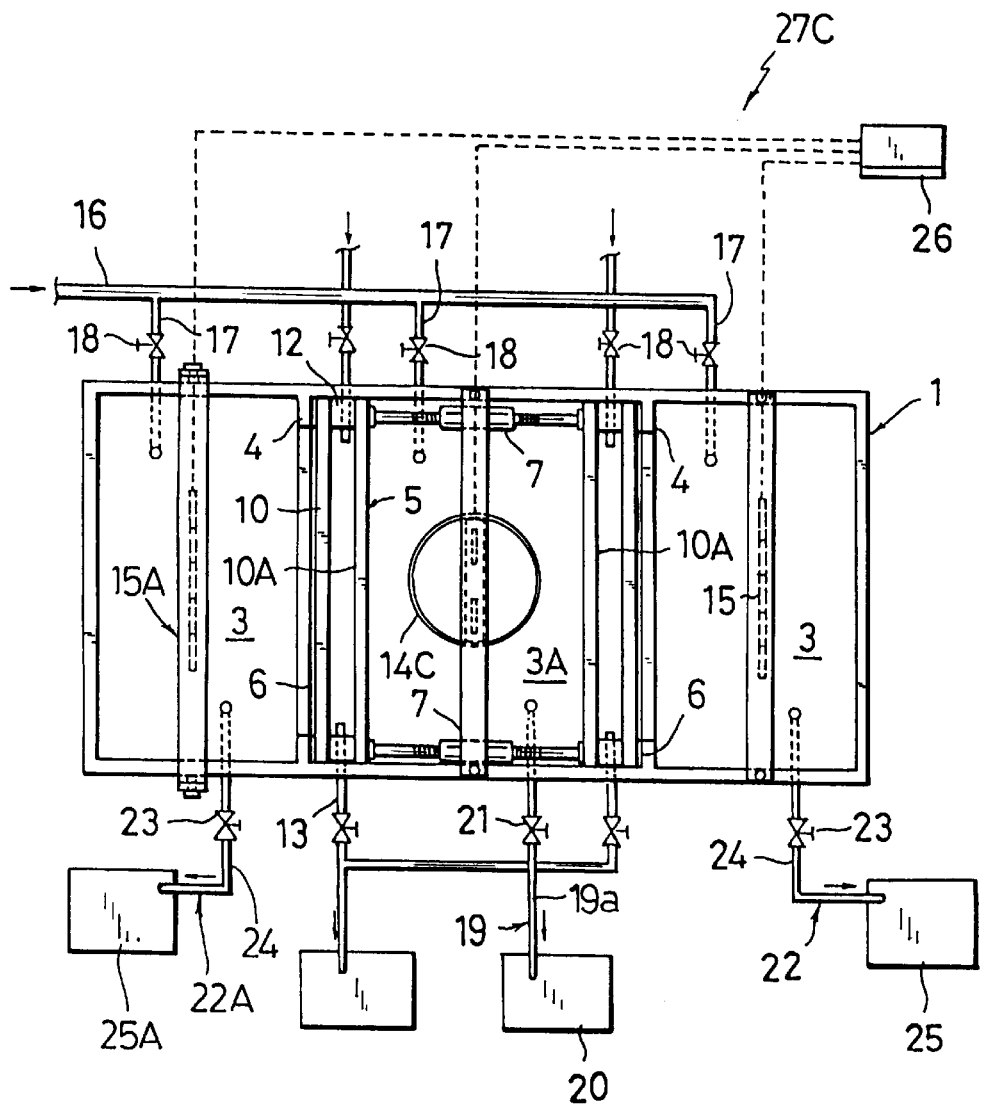
FIG. 11 is a plan view showing a fourth embodiment of the present invention.
Figure 12:
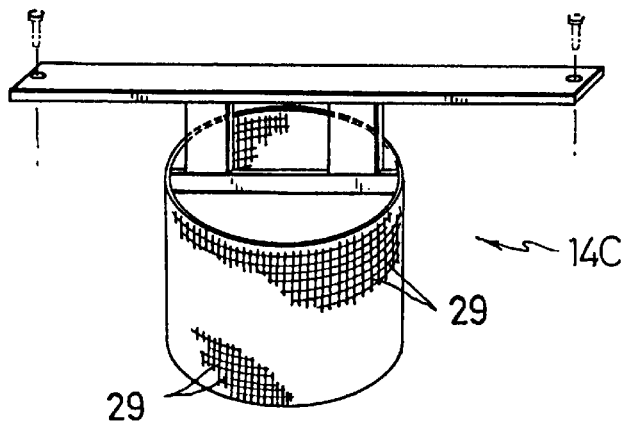
FIG. 12 is an explanation view of an anode in the fourth embodiment of the present invention.

FIGS. 9 and 10 illustrate device 27B as the third embodiment of the present invention; this is distinguished from the second embodiment in that at least two anodes, three of which 14B, 14B, 14B are shown in these figures, and are woven or knitted from linear material 29 composed of platinum plated titanium in the form of a mesh and arranged in a row at predetermined intervals in intermediate electrolytic chamber 3A of electrolytic cell 1. Device 27B as the third embodiment will provide the same function as that of the second embodiment. FIGS. 11 and 12 illustrate device 27C as the fourth embodiment of the present invention; this is distinguished from the second embodiment in that anode 14C is woven or knitted from linear material 29 composed of platinum plated titanium in the form of a mesh in the shape of a cylinder, such anode being located in intermediate electrolytic chamber 3A of electrolytic cell 1. Device 27C as the fourth embodiment will provide the same function as that of the second embodiment.

Figure 13:
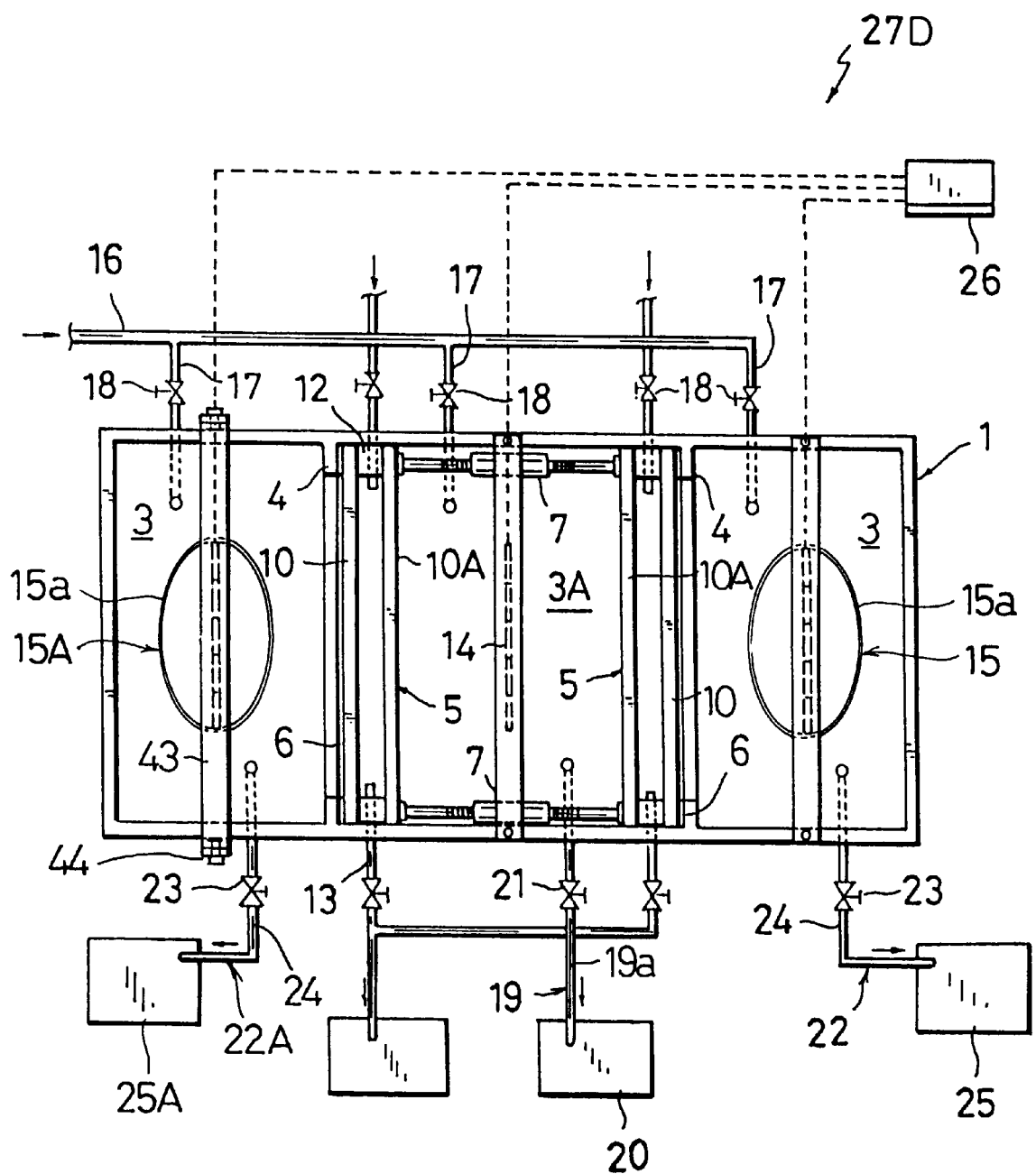
FIG. 13 is a plan view showing a fifth embodiment of the present invention.
Figure 14:
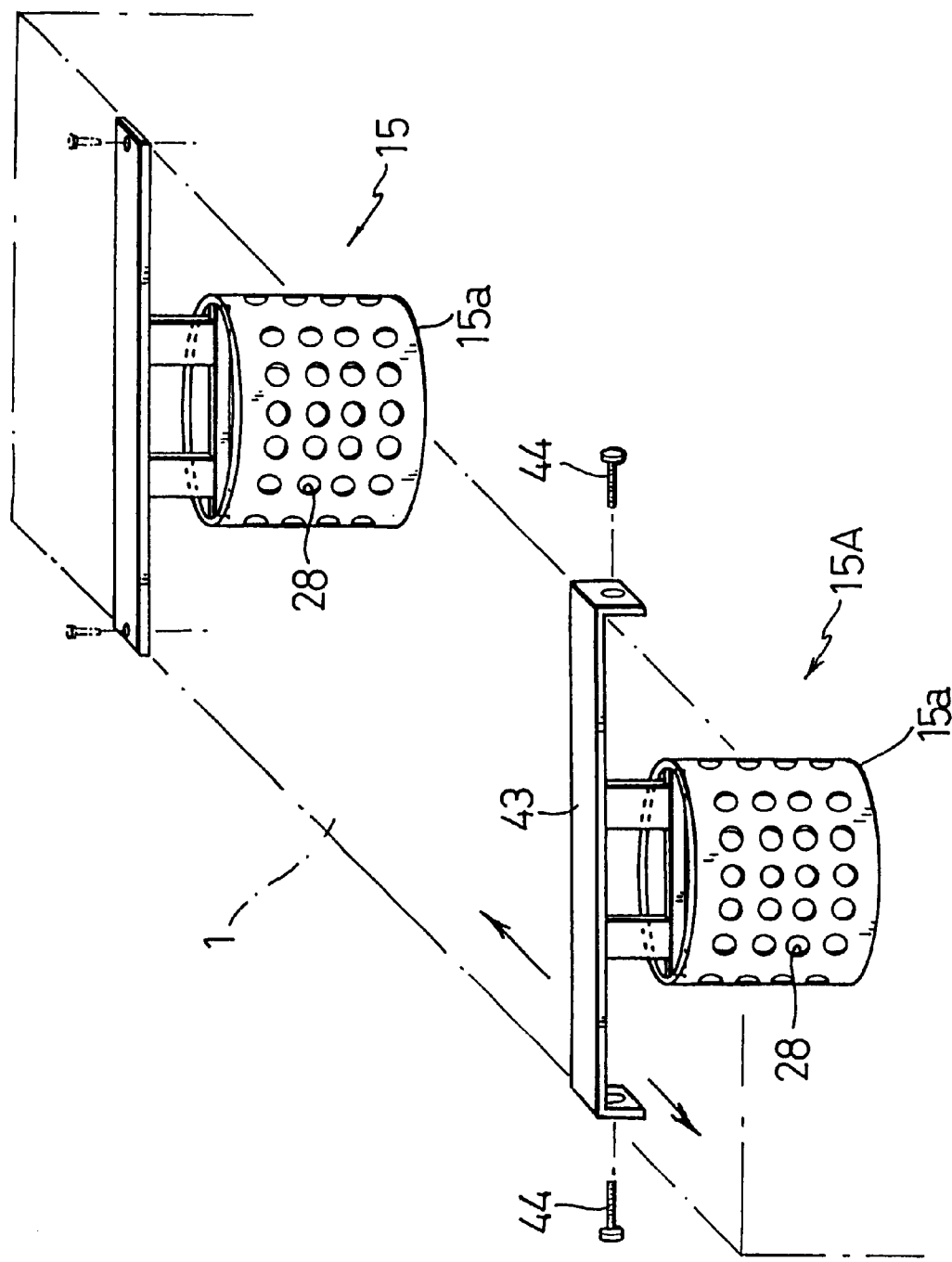
FIG. 14 is an explanation view of a cathode in the fifth embodiment of the present invention.

FIGS. 13 and 14 illustrate device 27D as the fifth embodiment of the present invention; this is distinguished from the first embodiment in that different forms of non-movable cathode 15 and movable cathode 15A are used. Cathodes 15 and 15A include electrode plates 15a and 15a each in the shape of an oval-shaped cylinder, and composed of a platinum plated titanium base, having a plurality of holes 28 and positioned in electrolytic chambers 3 and 3 at the sides of electrolytic cell 1. Device 27D as the fifth embodiment will provide the same function as that of the first embodiment of the present invention.

Figure 15:
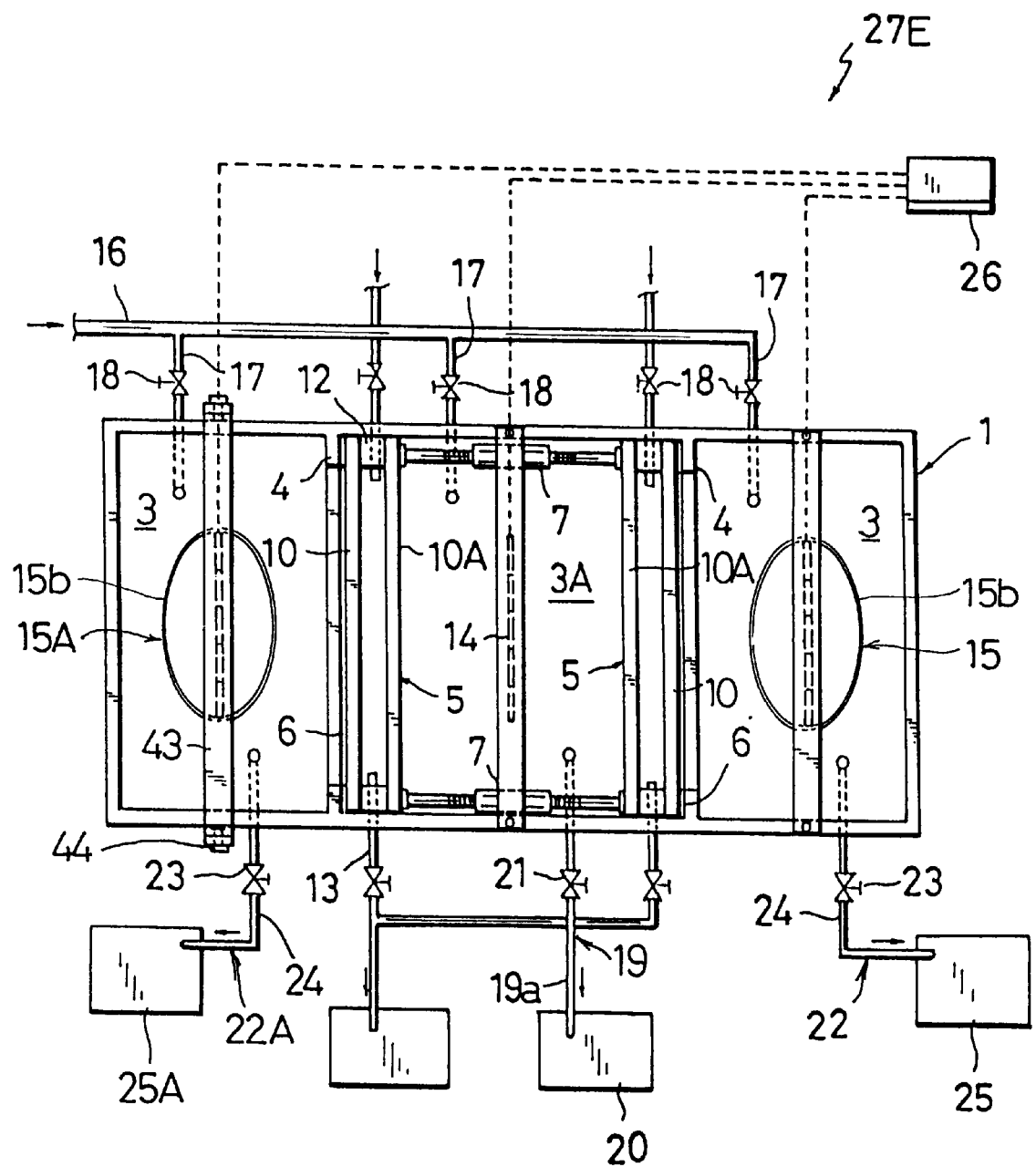
FIG. 15 is a plan view showing a sixth embodiment of the present invention.
Figure 16:
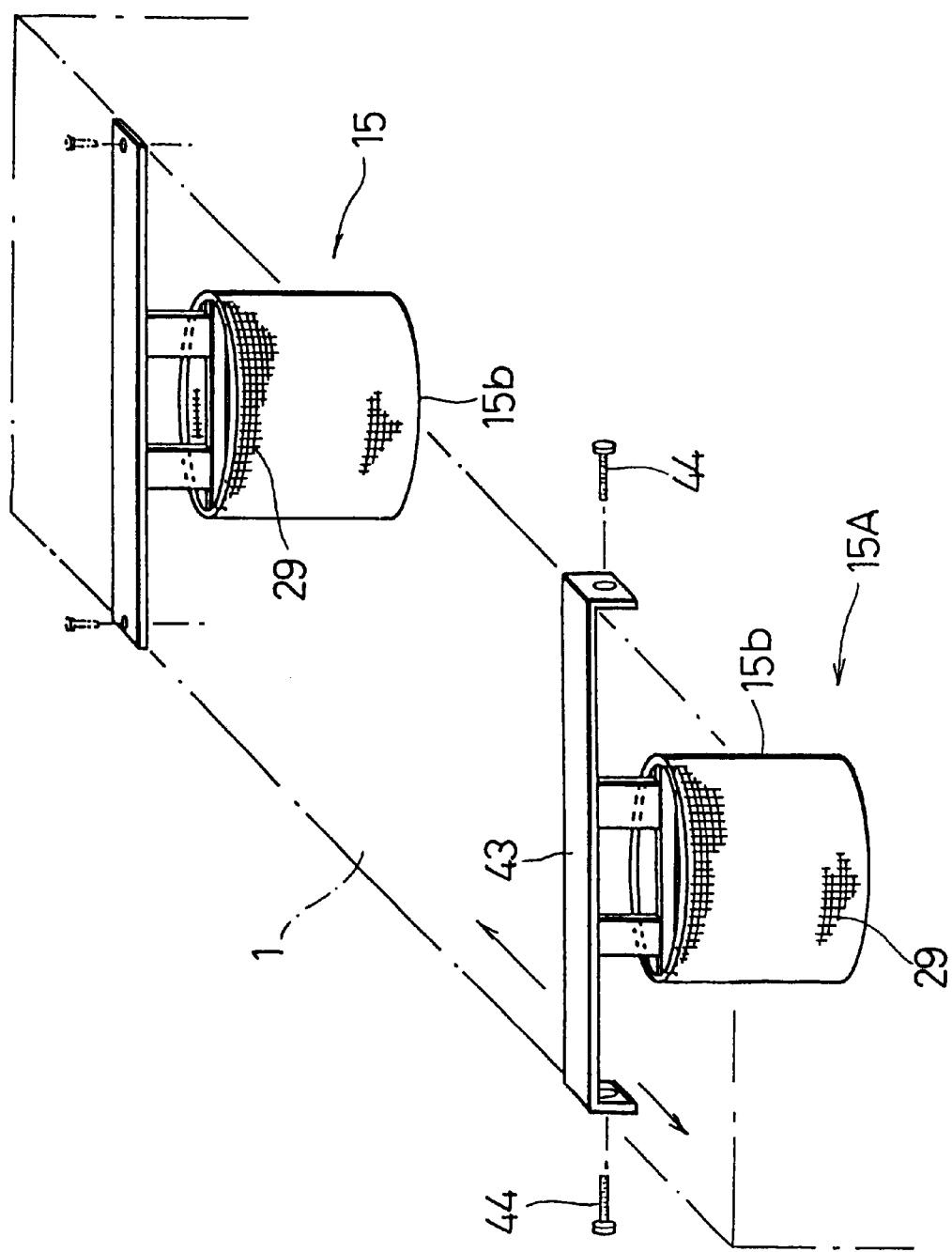
FIG. 16 is an explanation view of a cathode in the sixth embodiment of the present invention.

FIGS. 15 and 16 illustrate device 27E as the sixth embodiment of the present invention; this is distinguished from the fifth embodiment in that different forms of non-movable cathode 15 and movable cathode 15A are used. Cathodes 15 and 15A include electrode elements 15a and 15a each in the shape of an oval-shaped cylinder formed from a mesh which is woven or knitted from a linear material 29 composed of platinum plated titanium. Device 27E as the sixth embodiment will provide the same function as of the fifth embodiment of the present invention.

Figure 17:
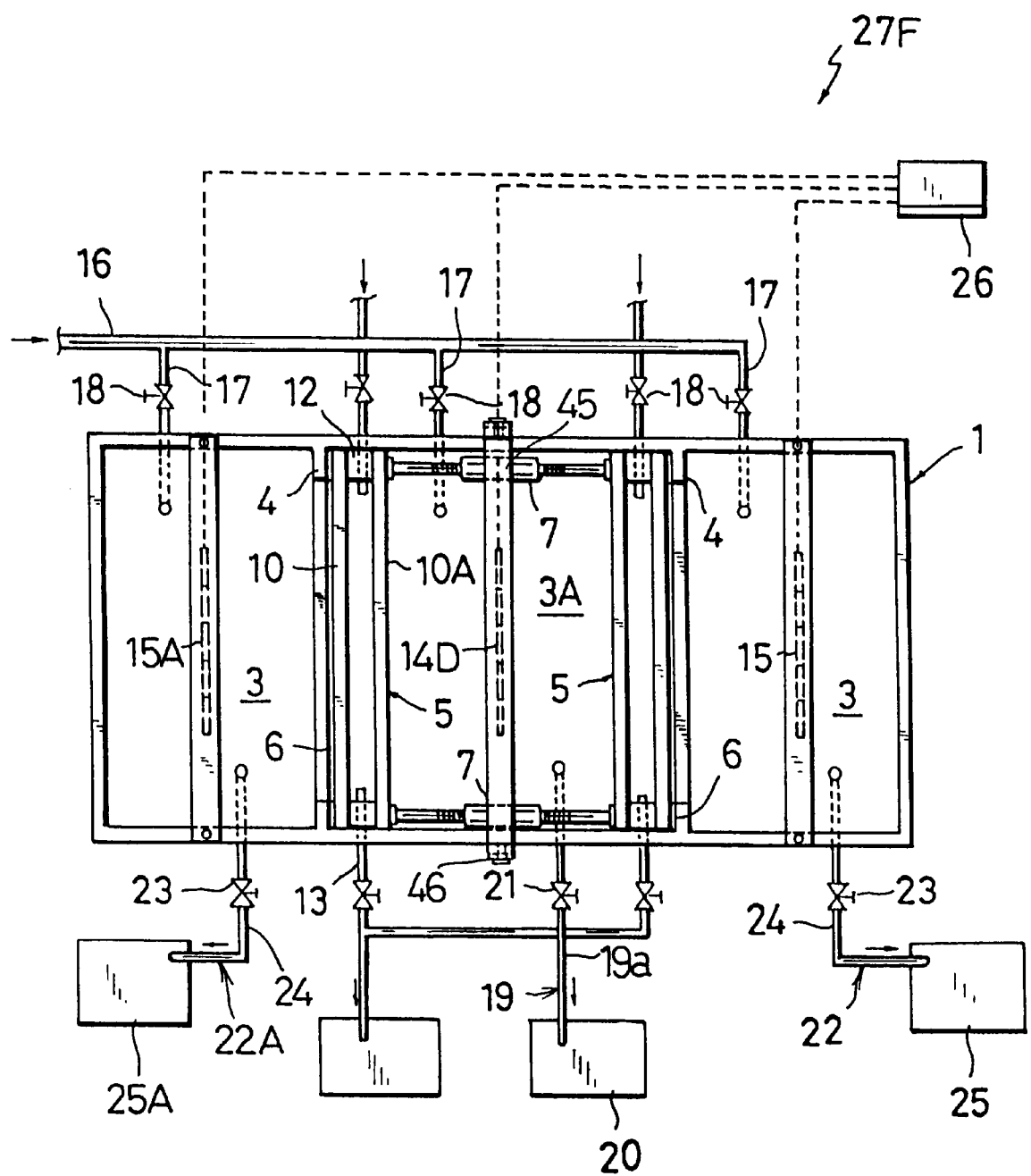
FIG. 17 is a plan view showing a seventh embodiment of the present invention.
Figure 18:
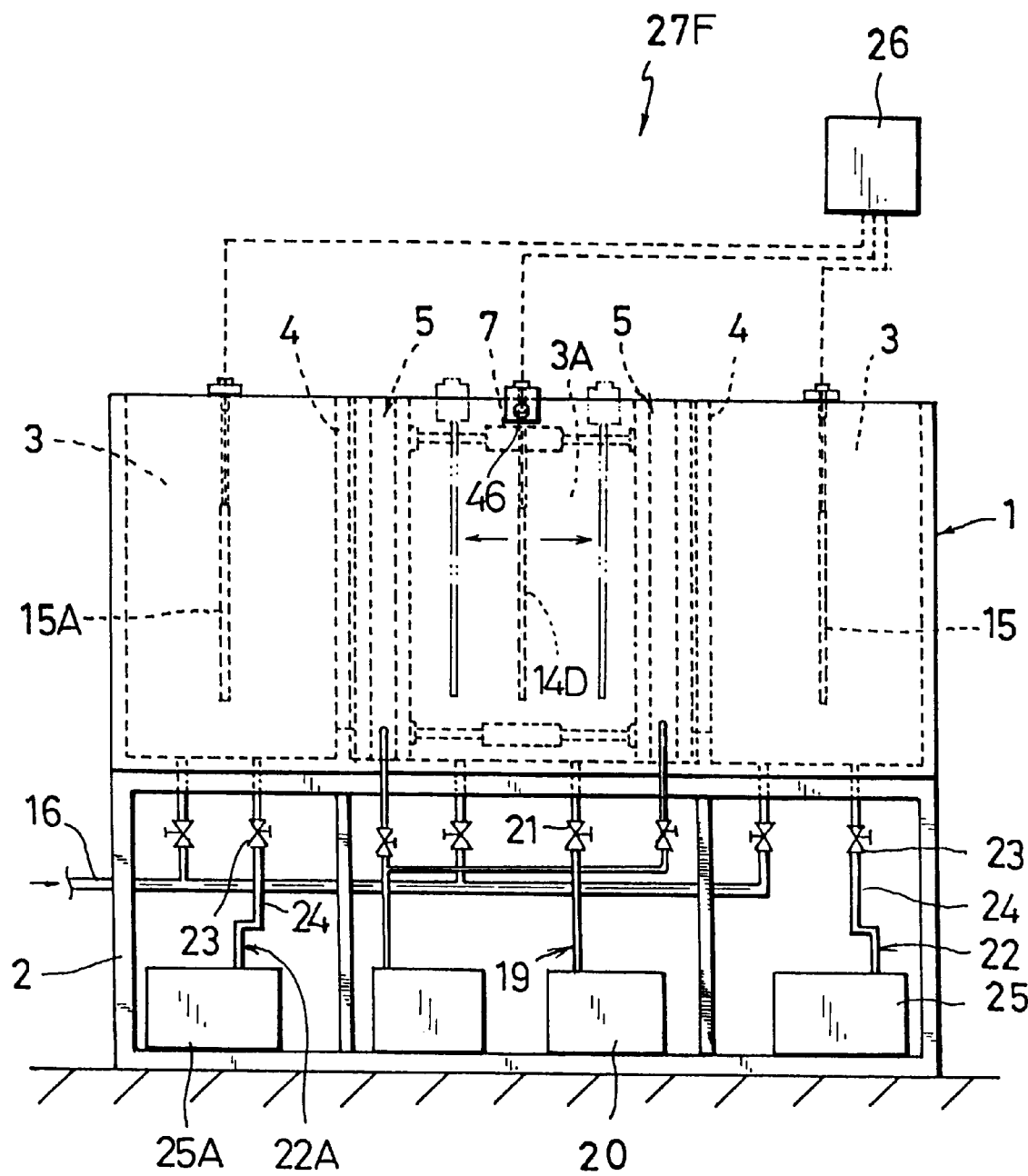
FIG. 18 is a front view showing a seventh embodiment of the present invention.

FIGS. 17 and 18 illustrate device 27F as the seventh embodiment of the present invention; this is distinguished from the first embodiment in that cathodes 15 and 15A are fixed in electrolytic chambers 3,3 located at both sides of electrolytic cell 1, and anode 14D is provided with anode support member 45 locked by bolts 46 and 46 in electrolytic chamber 3A of the electrolytic cell 1 such that anode 14D is positioned optionally. Device 27F as the seventh embodiment will provide the same function as that of the first embodiment of the present invention.

Figure 19:
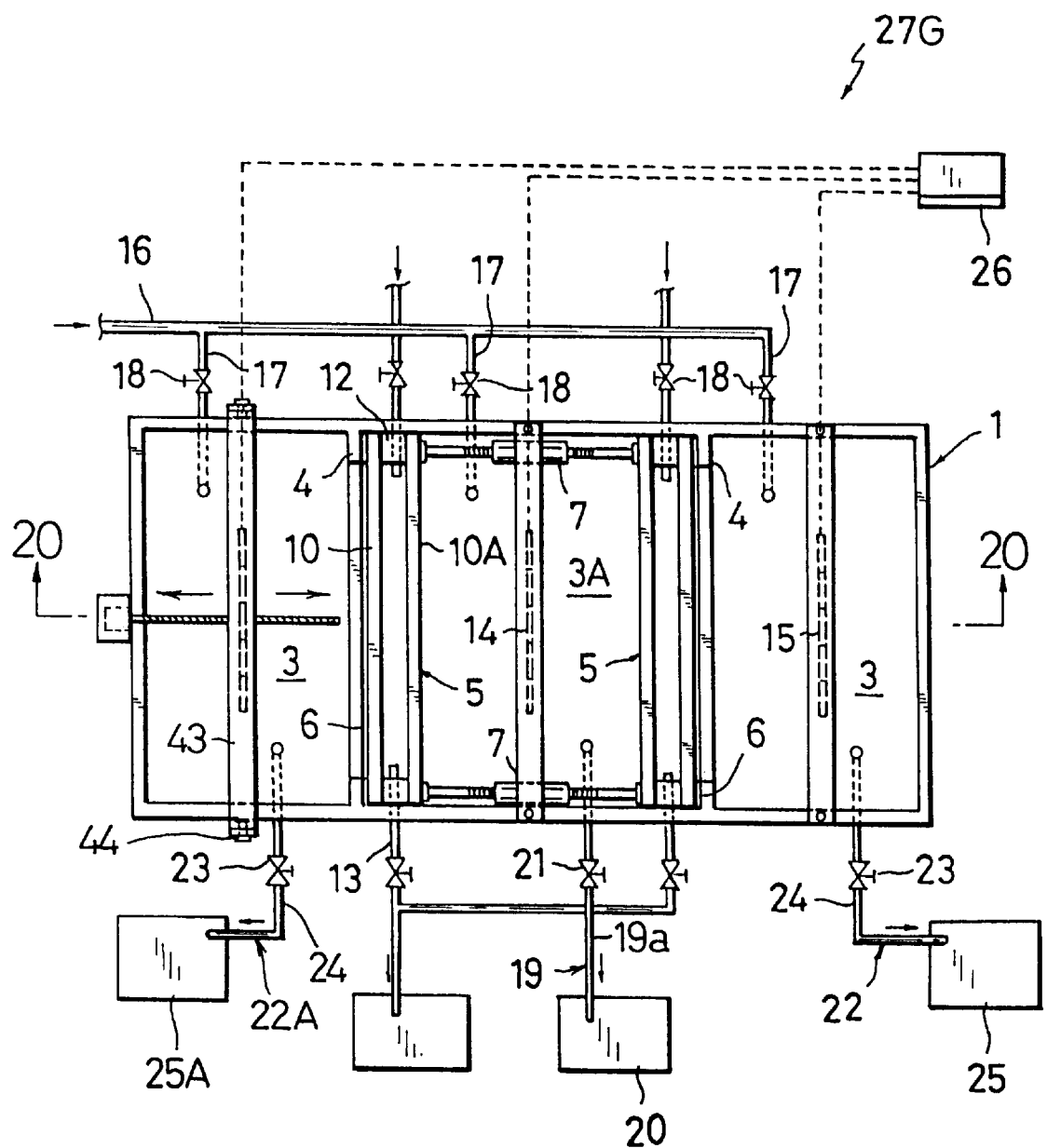
FIG. 19 is a plan view showing an eighth embodiment of the present invention.
Figure 20:
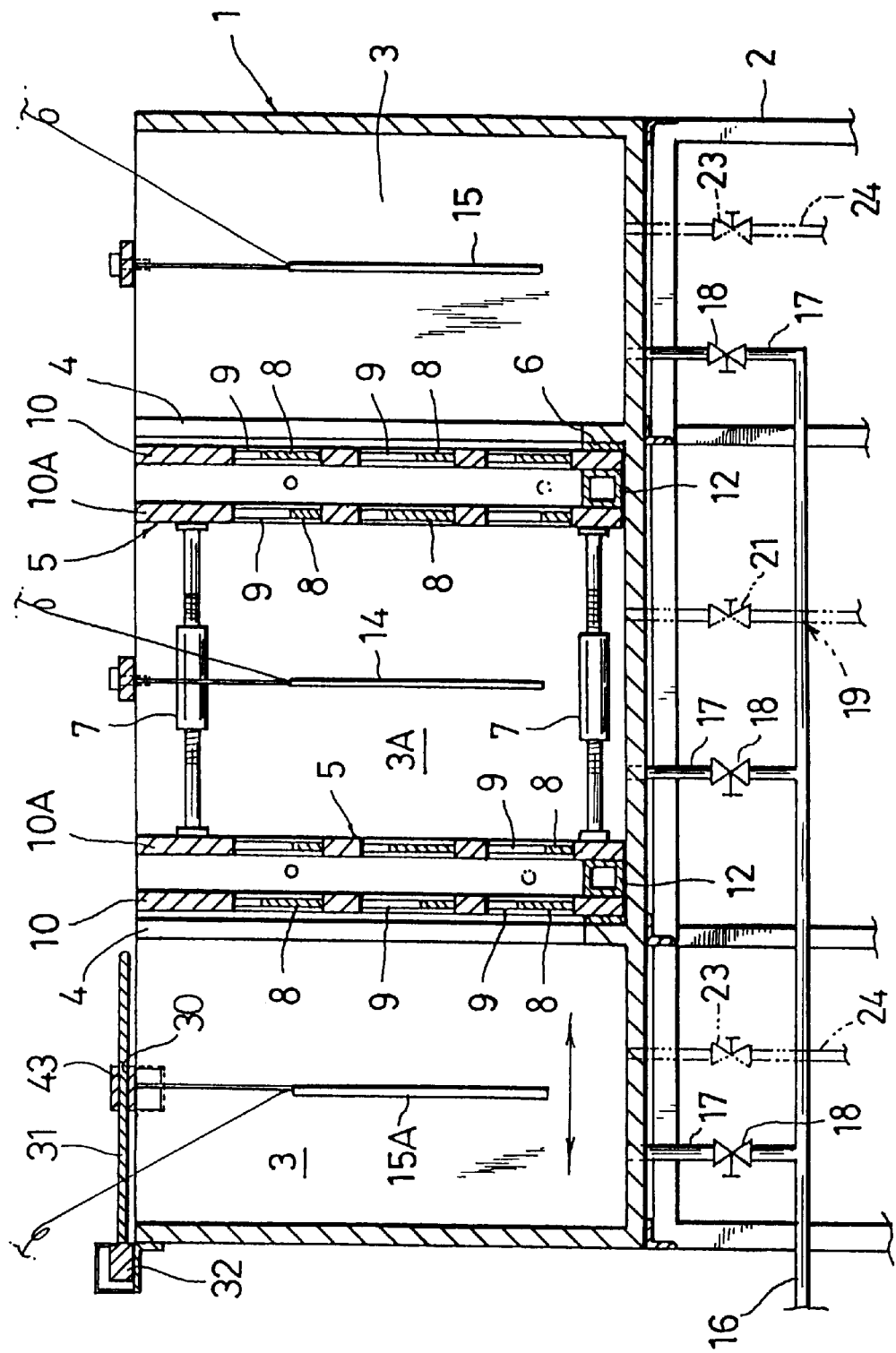
FIG. 20 is an expanded cross sectional view taken along the line 20—20 of FIG. 19.
Figure 21:
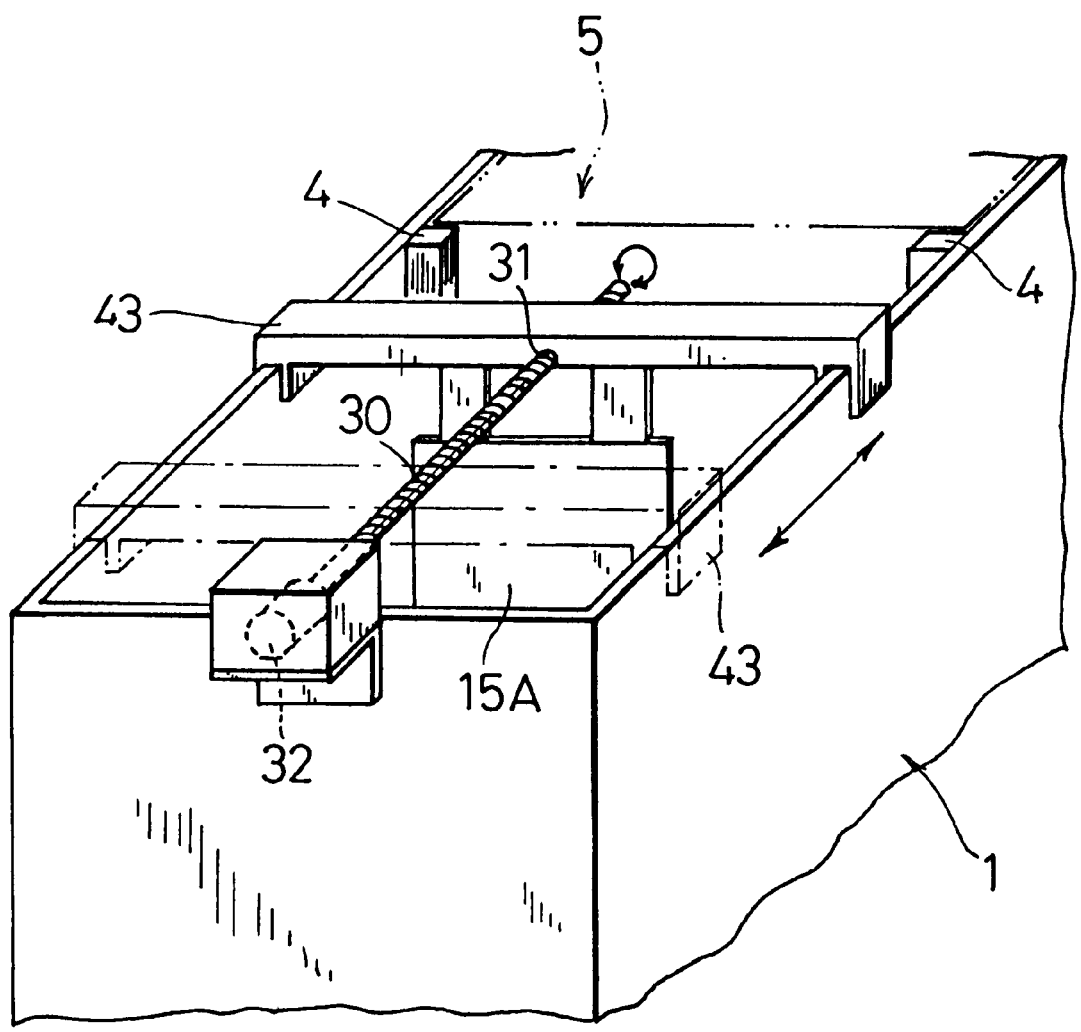
FIG. 21 is an explanation view including a movable cathode in the eighth embodiment of the present invention.
Figure 22:
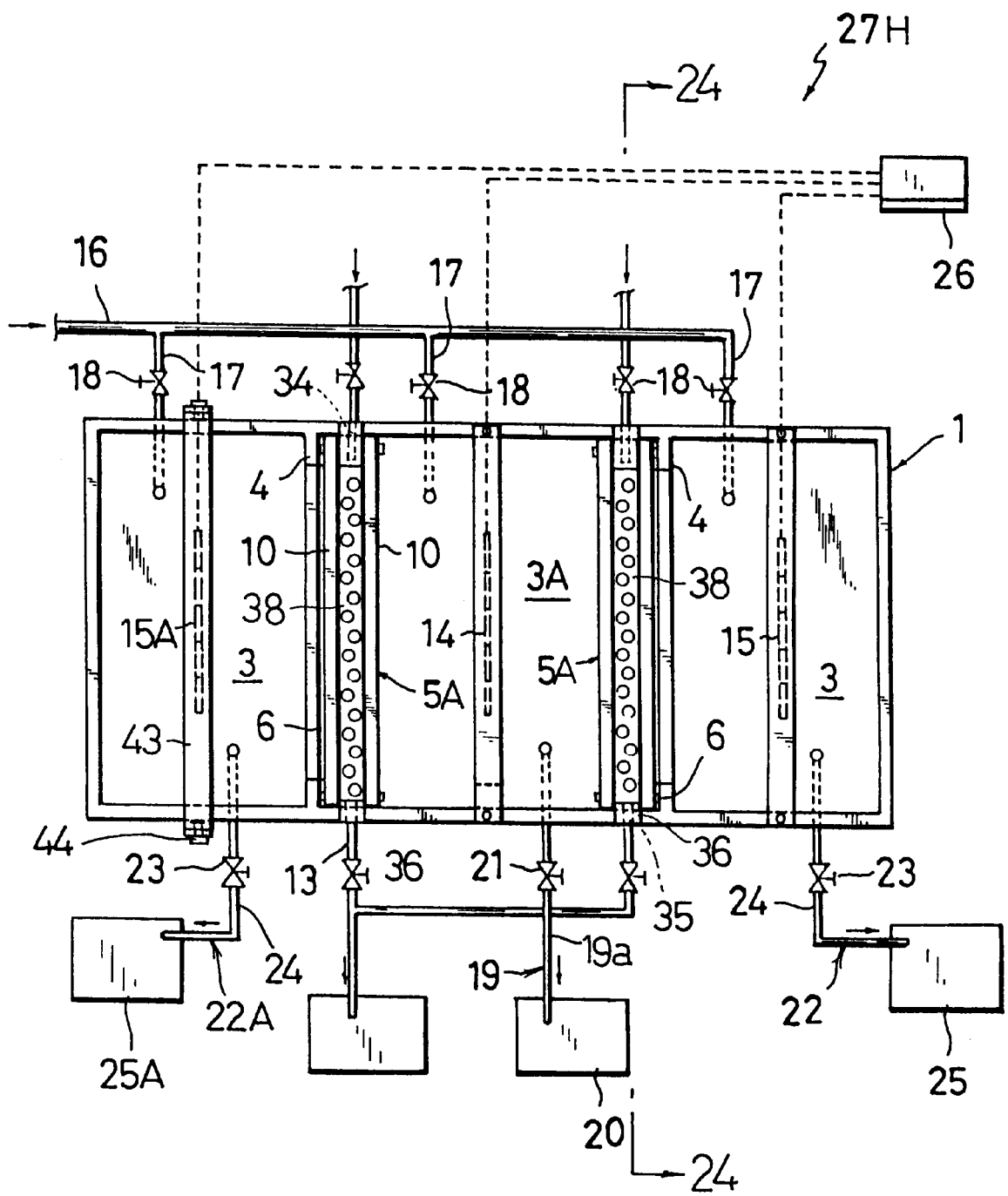
FIG. 22 is a plan view showing a ninth embodiment of the present invention.
Figure 23:
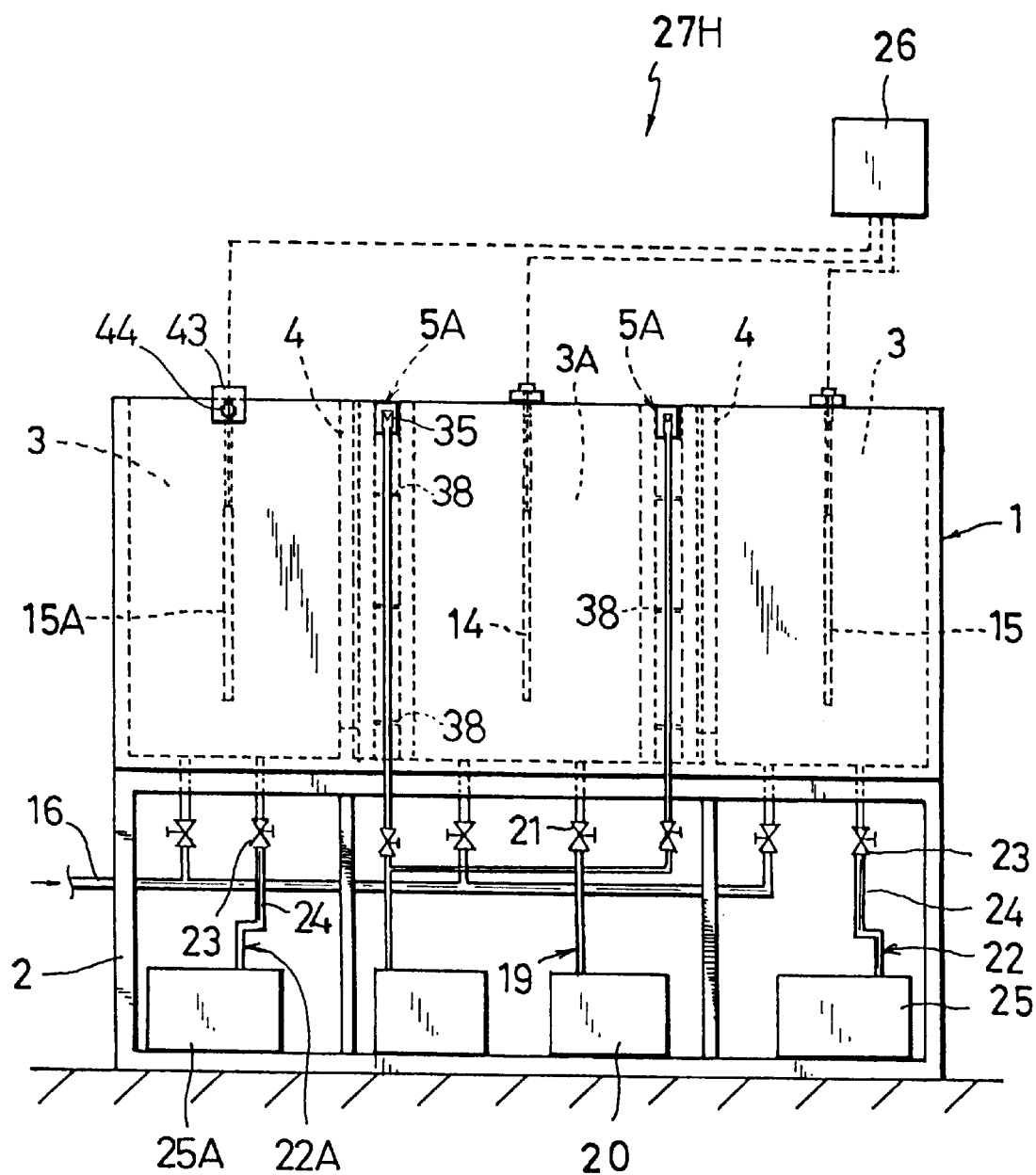
FIG. 23 is a front view showing a ninth embodiment of the present invention.
Figure 24:
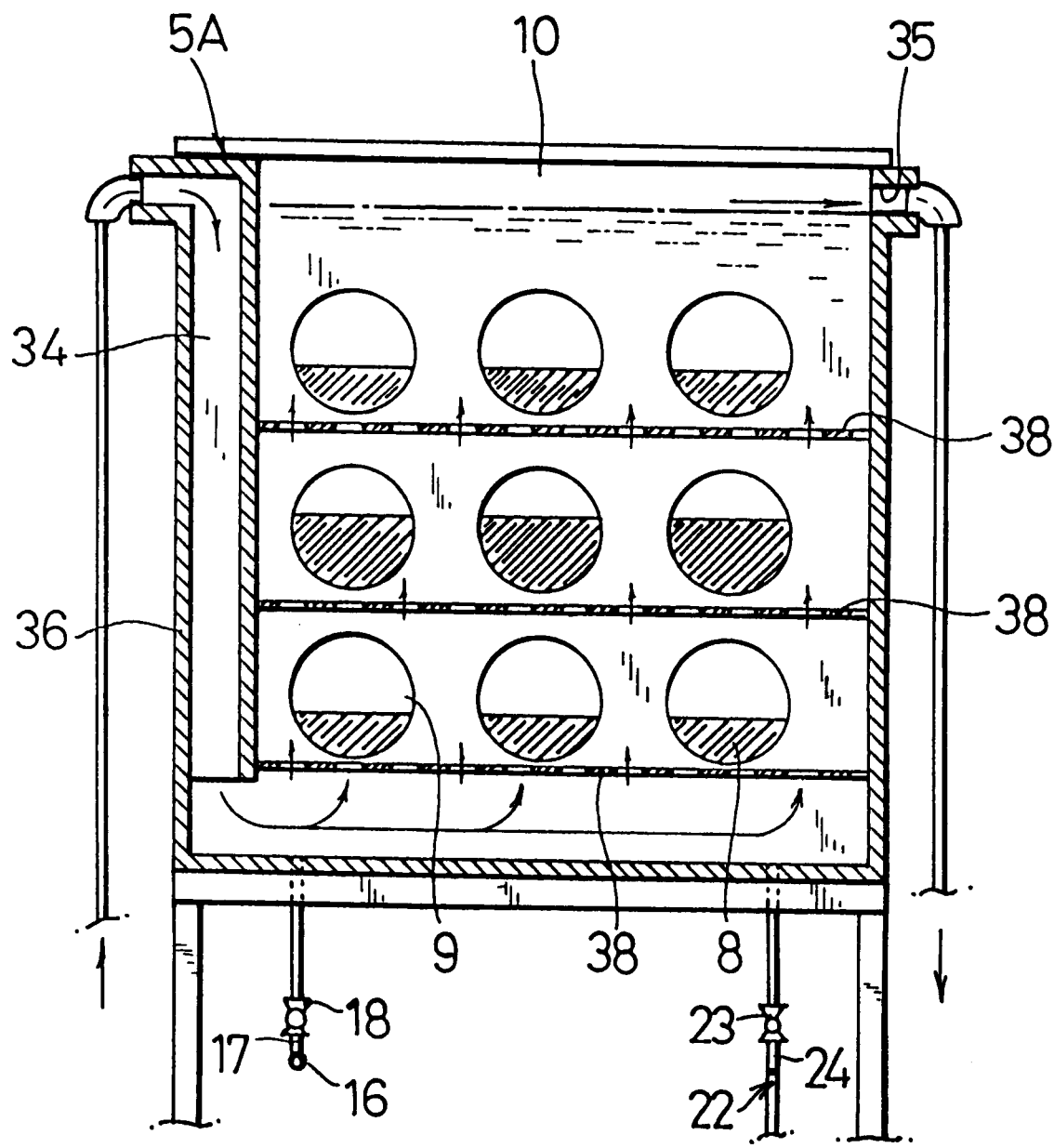
FIG. 24 is an expanded cross sectional view taken along the line 24—24 of FIG. 20.
Figure 25:
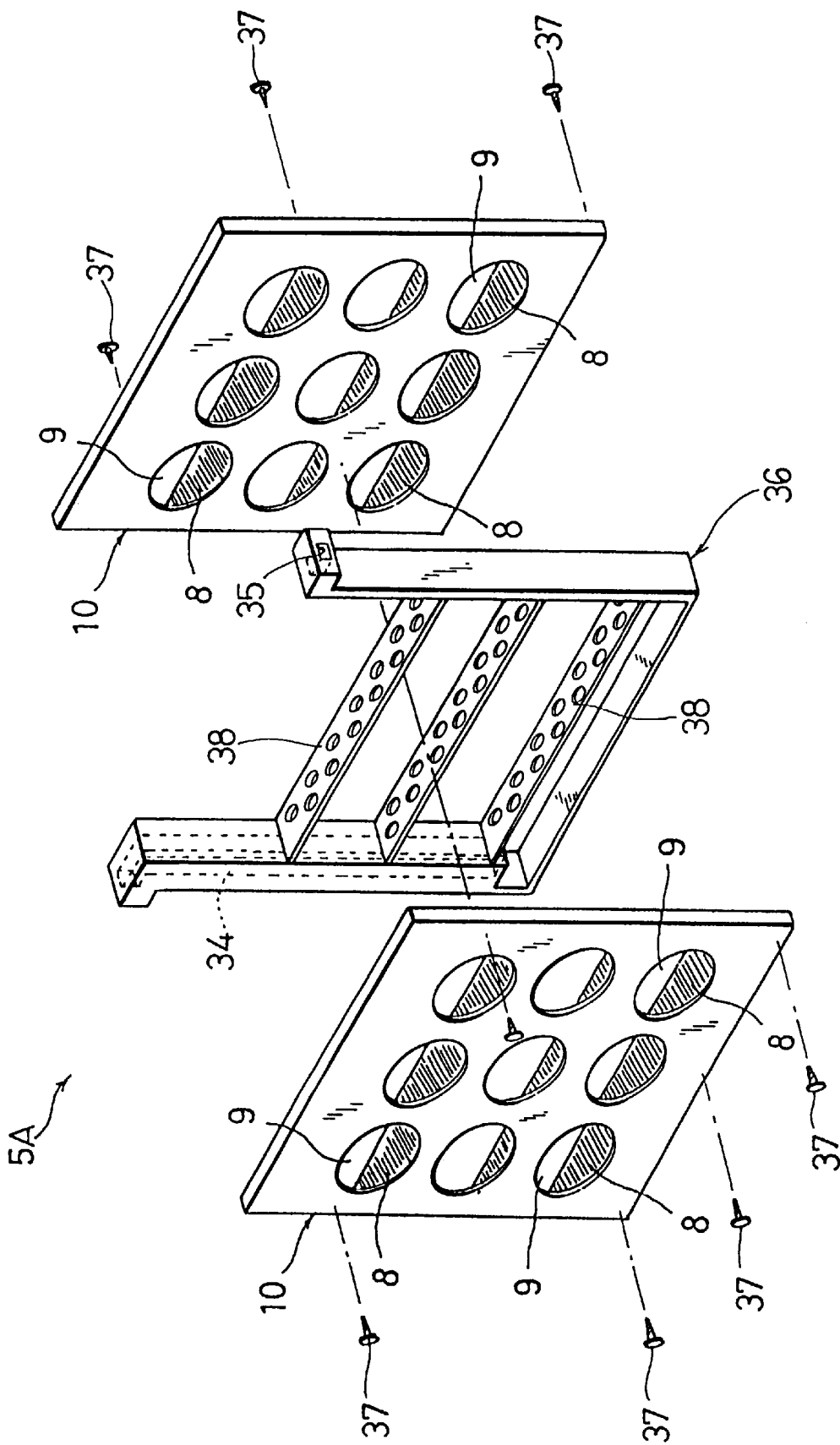
FIG. 25 is an exploded perspective view of a partition wall in the ninth embodiment of the present invention.

FIGS. 19 to 21 illustrate device 27G as the eighth embodiment of the present invention; this is distinguished from the first embodiment in that cathode support member 43 is provided which moves glidingly on the upper portion of electrolytic cell 1, and moving equipment 33 of cathode support member 43 is used in this embodiment. Moving equipment 33 allows a screw shaft 31 with meshing screw hole 30 formed adjacent a center portion of the cathode support member 43 to rotate forward and backward by reversible motor 32 provided to electrolytic cell 1. Device 27G according to the eighth embodiment will provide the same function as that of the first embodiment of the present invention.

Additionally, device 27G can carry out electrolysis while allowing cathode support member 43 to move as far as the fixed position after removable foreign matter such as clothing lint collects in electrolytic chamber 3 because cathode support member 43 moves glidingly by moving equipment 33 and device 27G continues to operate owing to the broad opening of electrolytic chamber 3 in electrolytic cell 1.

FIGS. 22 to 25 illustrate device 27H as the ninth embodiment of the present invention; this is distinguished from the fifth embodiment in that two partition walls 5A and 5A comprise respectively a frame 36 fonned in U-shape; a pair of partition wall bodies 10 and 10; and equalizing plates 38,38,38. Frame 36 further comprises a channel 34 formed at one side wall thereof, extending from upper portion to lower portion thereof, channel 34 supplying water to raise ion concentration; and spout 35 formed at the upper portion of another side wall. The pair of partition wall bodies 10 and 10 are fixed by a plurality of screws 37 so as to cover both sides of frame 36, attached to cation exchange membranes 8 and anion exchange membranes 9. At least one equalizing plate 38, three of which are used in this embodiment of the present invention, is supported by frame 36 covered by partition wall bodies 10,10 and is a plate having holes. Device 27H according to the ninth embodiment will provide the same function as that of the fifth embodiment of the present invention; in addition, water to raise ion concentration supplied into partition walls 5A and 5A flows from the lower portion to the upper portion in order, so that device 27H allows for the efficient production of ion water.

Figure 26:
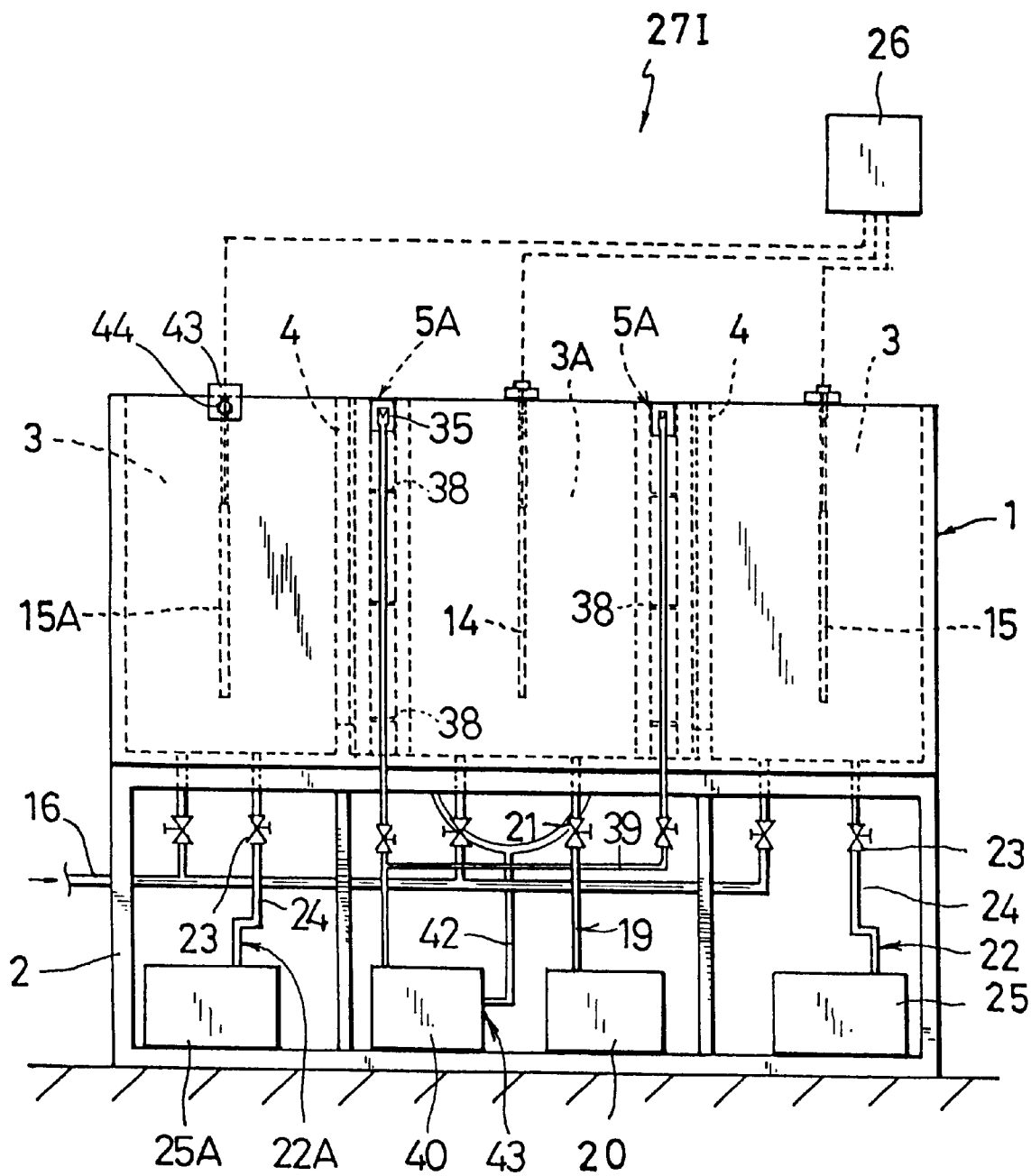
FIG. 26 is a plan view showing a tenth embodiment of the present invention.
Figure 27:
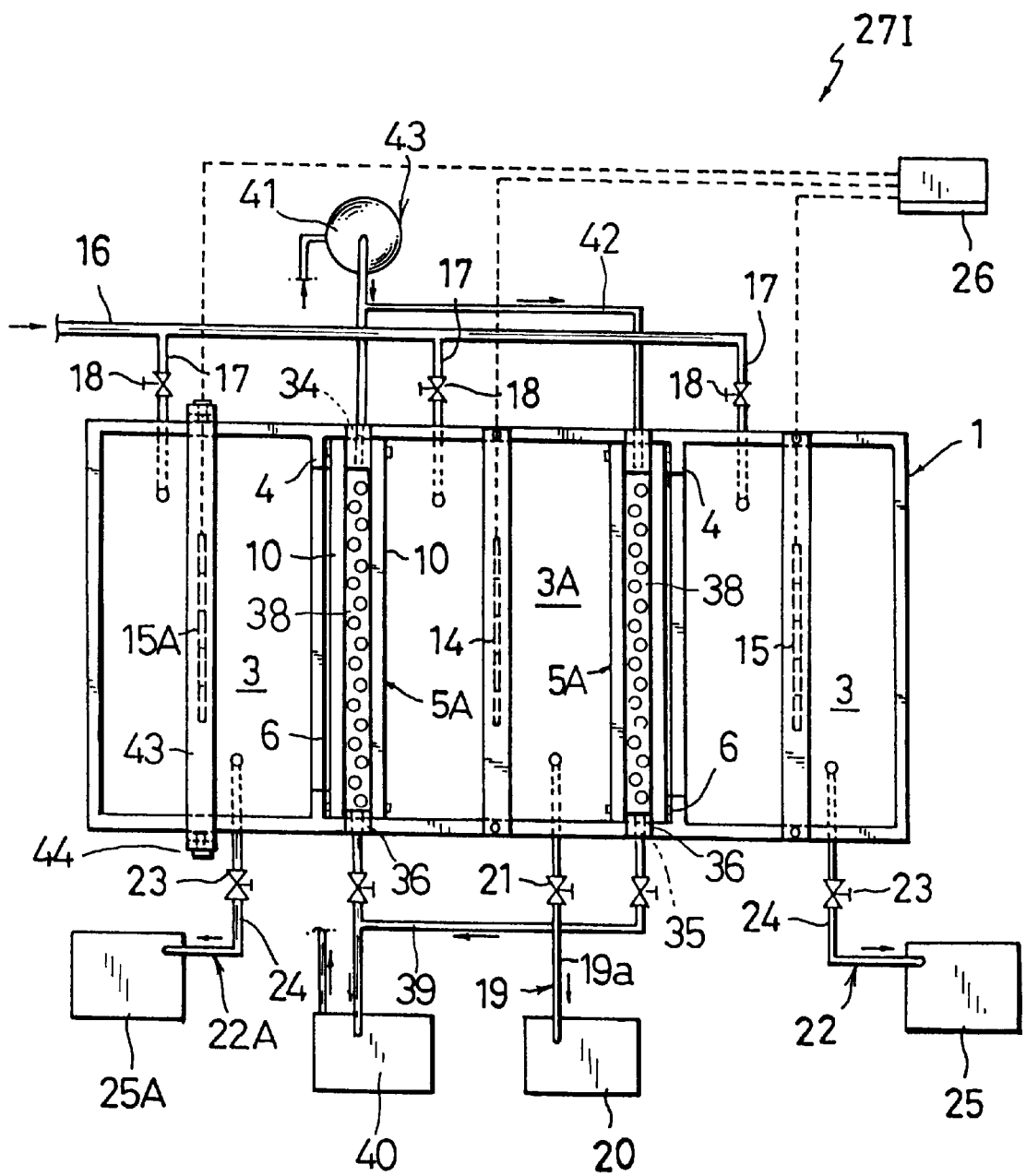
FIG. 27 is a front view showing a tenth embodiment of the present invention.
Figure 28:
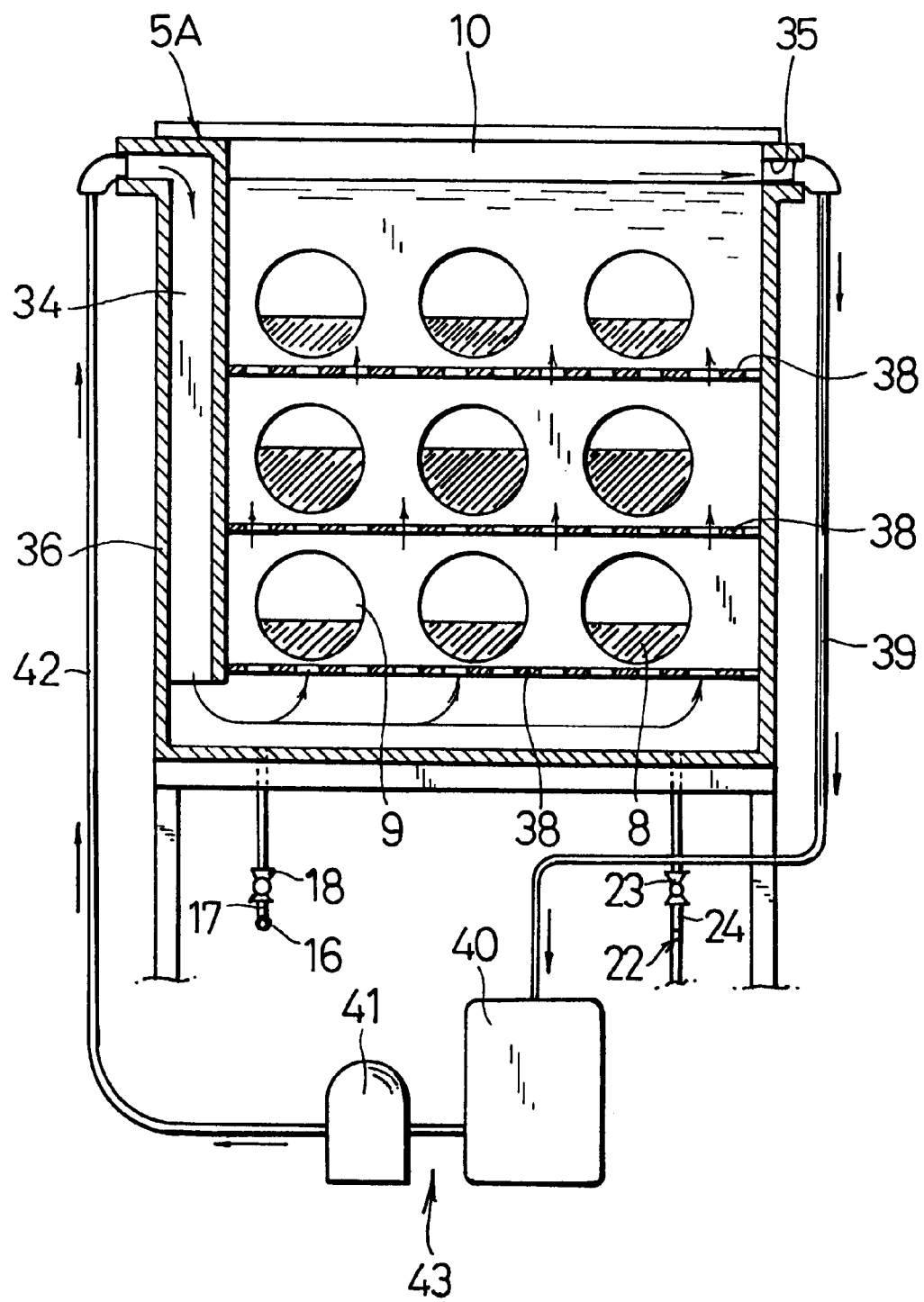
FIG. 28 is an explanation view of an overflow water supplying device in the tenth embodiment of the present invention.

FIGS. 26 to 28 illustrate device 27I as the tenth embodiment of the present invention; this is distinguished from the ninth embodiment in that overflow water discharged from spouts 35 and 35 of partition walls 5A and 5A is collected in overflow water collecting tank 40 through hose-pipe 39. Additionally, overflow water supplying device 43 includes supplying hose-pipe 42 interposed between pump 41 and partition wall 5A and device 43 can supply overflow water from overflow water collecting tank 40 to electrolytic chamber 3A. Device 27I according to the tenth embodiment of the present invention can produce acid ion water efficiently by supplying overflow water having a pH in the range of 5 to 6 and used in order to raise ion concentration in electrolytic chamber 3A which produces acid ion water; in addition, device 27I can reuse the discharged water efficiently.

ADVANTAGES OF THE INVENTION

As set forth above, the advantages of the present invention are as follows:

(1) A device for producing ion water comprises an electrolytic cell; two of partition walls equipped with ion exchange membranes and disposed such that the electrolytic cell is partitioned into three electrolytic chambers; an anode provided fixedly in an intermediate electrolytic chamber of said electrolytic cell or provided movably in the direction of said chambers located at both sides of said intermediate electrolytic chamber; and two cathodes respectively provided fixedly in the electrolytic chambers located at both sides of said electrolytic cell or movably in the direction of said anode each cathode receiving half the amount of electric current which is delivered to the anode so that the device can produce three different types of ion water including acid ion water and two kinds of alkaline ion water having different pH ranges.

Therefore, the device can produce three types of ion water at reduced cost.

(2) As discussed above, the device may be adjusted by moving the anode or cathodes so that such device can produce acid ion water and the different kinds of alkaline ion water easily.

(3) As discussed above, the quantity of hydrogen ions generated can be balanced by controlling the quantity of electricity utilized in the system. Therefore, the desired pH of the ion water can be controlled.

Additionally, anions and cations which move an electric charge by an electrolysis reaction can be separated and selected by the ion exchange membrane.

(4) Since a cation exchange membrane and an anion ion exchange membrane are respectively provided for two partition walls the generation of pure acid ion water and alkaline ion water can be accomplished.

(5) The quantity of electricity delivered can be increased by the amount of water which is supplied to the partition walls, and in turn controls the quantity of hydrogen ions generated such that the ion density of the water can be increased.

(6) By using at least two anodes or cathodes which have the form of a plate having a plurality of holes or formed as a mesh in the shape of a cylinder, the rate of delivery of electricity can be increased, and can be used for the electrolysis of water including heavy metal. Also ions can be moved by the anode and strong acid ion water and strong alkaline ion water can be produced effectively.

What is claimed is:

1. A device for producing ion water comprising:

an electrolytic cell;

two partition walls equipped with ion exchange membranes and placed such that the electrolytic cell is partitioned into three electrolytic chambers therein;

an anode provided fixedly in an intermediate electrolytic chamber of said electrolytic cell or movably in the direction of chambers located at both sides of said intermediate electrolytic chamber; and two cathodes located in the electrolytic chambers located at both sides of said electrolytic cell, each provided fixedly or movably in a direction of said anode each cathode being fed half the amount of electric current flowing through said anode.

2. The device of claim 1, wherein said partition walls are equipped with a cation exchange membrane and an anion exchange membrane.

3. The device of claim 1, wherein said partition walls further comprise a pair of partition wall bodies each attached to a cation exchange membrane and an anion exchange membrane; a water chamber between the partition wall bodies; and means for supplying a water to the water chamber to increase ion density.

4. The device of claim 1, wherein the partition walls each further comprises a partition wall body in the shape of a box having a cation exchange membrane and anion exchange membrane; means for supplying water to raise the ion concentration in the partition wall body from a lower portion thereof; one or more equalizing plates provided in the partition wall body, the equalizing plates acting to equalize the water supplied to said partition wall; and collecting means for overflow water provided at the upper portion of said partition wall.

5. The device of claim 1, wherein the anode includes at least two electrode plates that are platinum plated titanium, having a plurality of holes therein.

6. The device of claim 1, wherein the anode includes an element which is platinum plated titanium in the shape of a cylinder said element being formed of a mesh or a plate having a plurality of holes.

7. The device of claim 1, wherein the cathode includes an element which is platinum plated titanium said element being formed of a mesh or a plate having a plurality of holes.

8. The device of claim 1, wherein the cathode includes an element which is platinum plated titanium in the shape of a cylinder said element being formed of a mesh or a plate having a plurality of holes.

9. The device of claim 1 wherein at least one of said anode or cathodes is movable.

10. A device for producing ion water comprising:

an electrolytic cell;

two partition walls equipped with ion exchange membranes and placed such that the electrolytic cell is partitioned into three electrolytic chambers therein;

an anode provided fixedly in an intermediate electrolytic chamber of said electrolytic cell or movably in a direction of said chambers located at both sides of said intermediate electrolytic chamber; and two cathodes located in the electrolytic chambers located at both sides of said electrolytic cell each provided fixedly or movably in a direction of said anode, each cathode being fed half the amount of an electric current which is delivered to the anode;

means for supplying water which is subjected to electrolysis in each of the electrolytic chambers;

means for collecting acid ion water which discharges the acid ion water generated in the intermediate electrolytic chamber into an acid ion water storage tank; and means for collecting alkaline ion water which effects the discharge of alkaline ion water generated in the chambers located at both sides of the electrolytic cell to an alkaline ion water storage tank.

11. The device of claim 10 wherein at least one of said anode or cathodes is movable.

12. A device for producing ion water comprising:

an electrolytic cell;

two partition walls further comprising partition wall bodies in the shape of a box having a cation exchange membrane and an anion exchange membrane at both side portions thereof such that the electrolytic cell is partitioned into three electrolytic chambers; means for supplying water to raise the ion concentration in the partition wall body from a lower portion thereof; one or more equalizing plates provided in the partition wall body, the equalizing plates acting to equalize the water supplied to said partition wall; and means for collecting overflow water at the upper portion of said partition wall bodies;

an anode provided fixedly in an intermediate electrolytic chamber of said electrolytic cell or movably in a direction of said chambers located at both sides of said intermediate electrolytic chamber; and two cathodes provided fixedly in the electrolytic chambers located at both sides of in said electrolytic cell or movably in the direction of said anode, the cathodes being fed half the amount of an electric current delivered to the anode;

means for supplying water which is subjected to electrolysis in each of the electrolytic chamber chambers;

means for collecting acid ion water and discharging the acid ion water generated in the intermediate electrolytic chamber to an acid ion water storage tank; and two separate means for collecting alkaline ion water and discharging the alkaline ion water generated in the chambers located at both sides of the electrolytic cell to an alkaline ion water storage tank; and means for supplying overflow water which is collected by the overflow water collecting means of the partition walls into the intermediate electrolytic chamber.

13. The device of claim 12 wherein at least one of said anode or cathodes is movable.

* * * * *